United States Patent
Arai

(10) Patent No.: US 7,925,062 B2
(45) Date of Patent: Apr. 12, 2011

(54) IMAGE PROCESSING APPARATUS, IMAGE PROCESSING METHOD, SIGNATURE REGISTRATION PROGRAM, AND STORAGE MEDIUM

(75) Inventor: Tsunekazu Arai, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1021 days.

(21) Appl. No.: 11/739,825

(22) Filed: Apr. 25, 2007

(65) Prior Publication Data

US 2008/0049986 A1 Feb. 28, 2008

(30) Foreign Application Priority Data

Apr. 28, 2006 (JP) ................................. 2006-126932

(51) Int. Cl.
*G06K 9/00* (2006.01)
(52) U.S. Cl. ........ 382/119; 382/122; 382/123; 382/186; 382/187
(58) Field of Classification Search .......... 382/119–123, 382/186–189
See application file for complete search history.

(56) References Cited

U.S. PATENT DOCUMENTS

| 6,393,138 B1 * | 5/2002 | Chai .............................. 382/119 |
| 7,792,336 B2 * | 9/2010 | Crockett et al. .............. 382/119 |
| 2008/0219519 A1 * | 9/2008 | Hu et al. ........................ 382/119 |

FOREIGN PATENT DOCUMENTS

JP 2001-155162 A 6/2001

* cited by examiner

*Primary Examiner* — Jon Chang
(74) *Attorney, Agent, or Firm* — Canon USA, Inc. IP Division

(57) ABSTRACT

Signature data of a handwritten signature input to a signature authentication device is analyzed to determine whether to register the signature based on the characteristics of the stroke shape of the signature. If the signature registration is denied, a response message for making the signature registerable is displayed according to the way in which the signature is written. At least one of cumulative angle changes in the locus of the signature, fluctuation in the speed at which the signature was written, fluctuation in the size of the characters included in the signature, and fluctuation in the center positions of the characters included in the signature is used as the determination criterion.

11 Claims, 23 Drawing Sheets

FIG. 6

| CONDITION NO. | CHARACTERISTIC CONDITION | RESPONSE MESSAGE |
|---|---|---|
| 1 | SMALL CUMULATIVE ANGLE CHANGE VALUE | YOUR SIGNATURE HAS MANY STRAIGHT LINES AND IS THEREFORE EASILY COPIED. IT IS RECOMMENDED THAT YOU INCLUDE CHARACTERS WITH CURVES, OR WRITE IN A CURSIVE OR RUNNING STYLE. |
| 2 | SMALL CUMULATIVE SPEED CHANGE VALUE | WRITING AT A CONSTANT SPEED MAKES YOUR SIGNATURE EASIER TO COPY. PLEASE TRY VARYING YOUR WRITING SPEED. |
| 3 | LITTLE DIFFERENCE IN SHAPE FROM STANDARD PATTERN | YOUR WRITING STYLE IS CLOSE TO A STANDARD DICTIONARY STYLE. PLEASE TRY USING DIFFERENT CHARACTERS OR A DIFFERENT STYLE OF WRITING. |
| 4 | LITTLE DIFFERENCE IN SIZE OF CHARACTERS | VARYING THE SIZE OF THE CHARACTERS WILL MAKE YOUR SIGNATURE MORE DIFFICULT TO PREDICT. |
| 5 | LITTLE DIFFERENCE IN POSITIONING OF CHARACTERS | VARYING THE POSITIONING OF THE CHARACTERS WILL MAKE YOUR SIGNATURE MORE DIFFICULT TO PREDICT. |

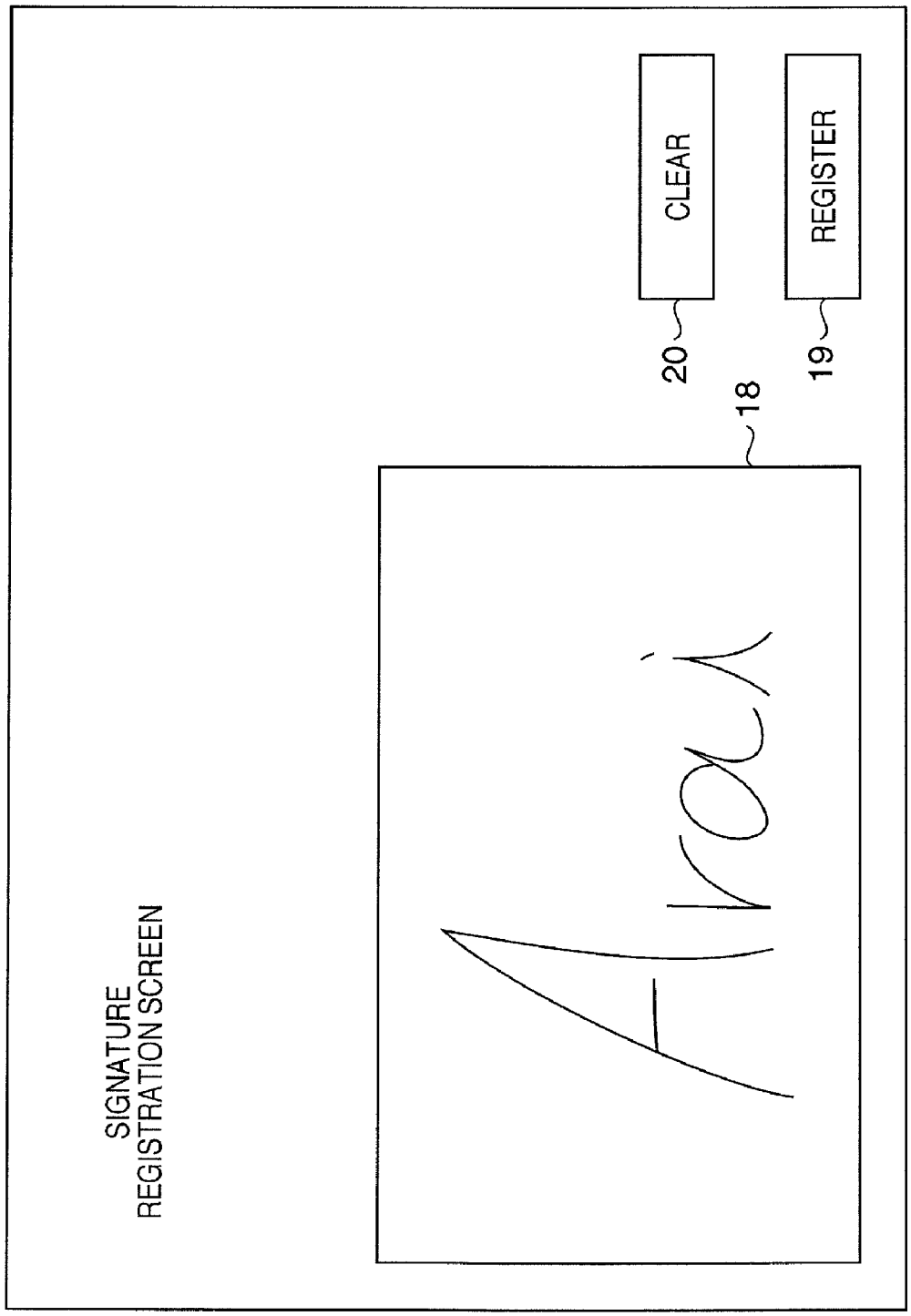

F I G. 13
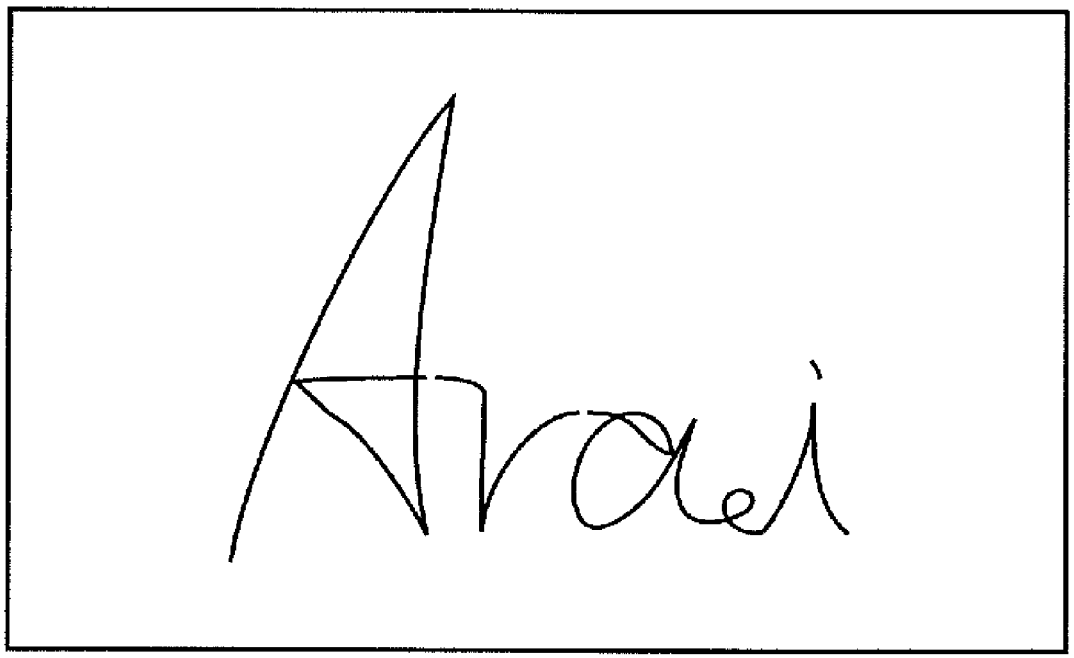

FIG. 14

| CONDITION NO. | CHARACTERISTIC CONDITION | TRANSFORMATION METHOD |
|---|---|---|
| 1 | SMALL CUMULATIVE ANGLE CHANGE VALUE | RANDOMLY CONNECT STROKES, RANDOMLY SHIFT POINTS ON CONNECTING LINES |
| 2 | SMALL CUMULATIVE SPEED CHANGE VALUE | RANDOMLY CHANGE DISTANCE BETWEEN POINTS |
| 3 | LITTLE DIFFERENCE IN SHAPE FROM STANDARD PATTERN | RANDOMLY CONNECT STROKES, RANDOMLY SHIFT POINTS ON CONNECTING LINES, RANDOMLY CHANGE DISTANCE BETWEEN POINTS |
| 4 | LITTLE DIFFERENCE IN SIZE OF CHARACTERS | RANDOMLY CHANGE SIZE OF CHARACTERS |
| 5 | LITTLE DIFFERENCE IN POSITIONING OF CHARACTERS | RANDOMLY SHIFT POSITIONING OF CHARACTERS |

IMAGE PROCESSING APPARATUS, IMAGE PROCESSING METHOD, SIGNATURE REGISTRATION PROGRAM, AND STORAGE MEDIUM

BACKGROUND OF THE INVENTION

1. Field of the Invention

The present invention relates to an image processing apparatus, an image processing method, a signature registration program, and a storage medium.

2. Description of the Related Art

Various image processing apparatuses and methods for use in signature authentication have been proposed (see Japanese Patent Application Laid-Open No. 2001-155162). These apparatuses may include a function for registering signatures that are to be authenticated. In the case of signature registration, an apparatus may measure the information content of an input signature, and permit or refuse registration depending on whether a measured value of the information content is respectively above or equal to, or below a specified value.

When registration is refused, these conventional image processing apparatuses merely display a message reporting that the signature has not been registered, and are not provided with a unit for reporting how the signature should be rewritten. Thus, the user may be compelled to rewrite the signature a plurality of times it is registered, which is inconvenient.

SUMMARY OF THE INVENTION

An embodiment of the present invention allows realization of more user friendly signature registration.

According to one aspect of the present invention, an apparatus comprises a determining unit configured to analyze signature data corresponding to a handwritten signature, and determine whether to register the signature based on a characteristic of the signature and a notifying unit configured to provide information relating to making the signature registerable according to a writing style of the signature, if it is determined by the determining unit not to register the signature.

According to another aspect of the present invention, a computer-readable storage medium storing a signature registration program for registering signature data corresponding to a handwritten signature for use in authentication is provided. The program causes a computer to execute operations comprising analyzing signature data corresponding to a handwritten signature, and determining whether to register signature based on a characteristic of the signature; and providing information relating to the analysis of the signature data, if it is determined not to register the signature.

Further features of the present invention will become apparent from the following description of exemplary embodiments with reference to the accompanying drawings.

BRIEF DESCRIPTION OF THE DRAWINGS

FIG. 6 is a table showing characteristic conditions of signature trajectories and response messages corresponding to the characteristic conditions.

FIG. 7 shows an exemplary signature registration screen.

FIG. 13 shows an example of the input signature data after having been transformed.

FIG. 14 is a table showing characteristic conditions of signature trajectories and transformation methods corresponding to the characteristic conditions.

DESCRIPTION OF THE EMBODIMENTS

Preferred embodiments of the present invention will now be described in detail with reference to the drawings. In should be noted that the relative arrangement of the components, the numerical expressions and the numerical values set forth in these embodiments do not limit the scope of the present invention unless it is specifically stated otherwise.

First Embodiment

Figure 1:
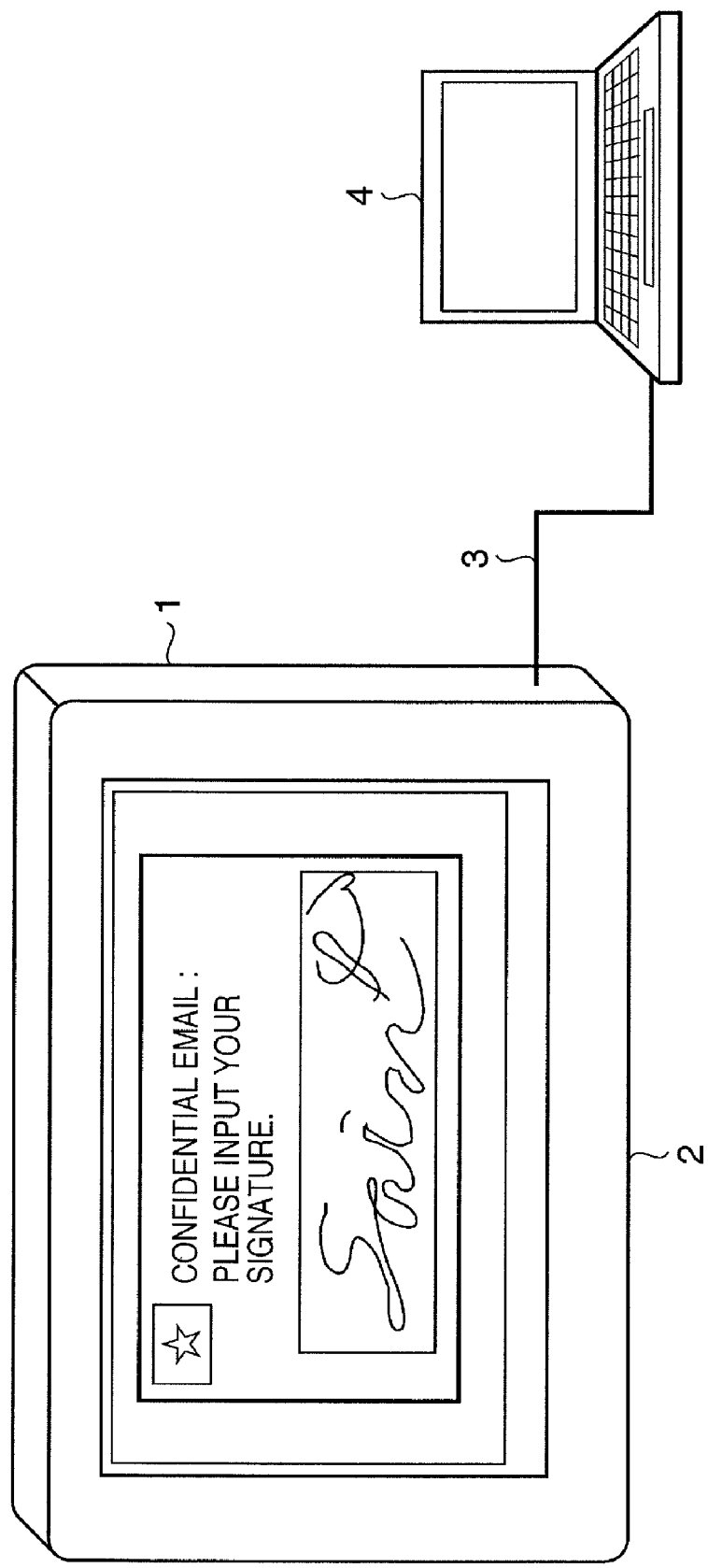
FIG. 1 shows a system configuration according to an embodiment of the present invention.

FIG. 1 shows a system that uses a signature authentication device 1 as an image processing apparatus according to an embodiment of the present invention. The signature authentication device 1 includes an input display unit 2 and an interface for connecting to a personal computer 4 via a network 3. Further, the signature authentication device 1 may also include a slot for inserting recording media. In operation, a user inputs handwritten signatures and performs other operation instructions and menu selections with respect to the input display unit 2 of the signature authentication device 1. The locus of input signatures, warning messages and the like are displayed on the input display unit 2. Confidential email messages to which signature authentication data is appended can be sent from the personal computer 4 to the signature authentication device 1.

Figure 2:
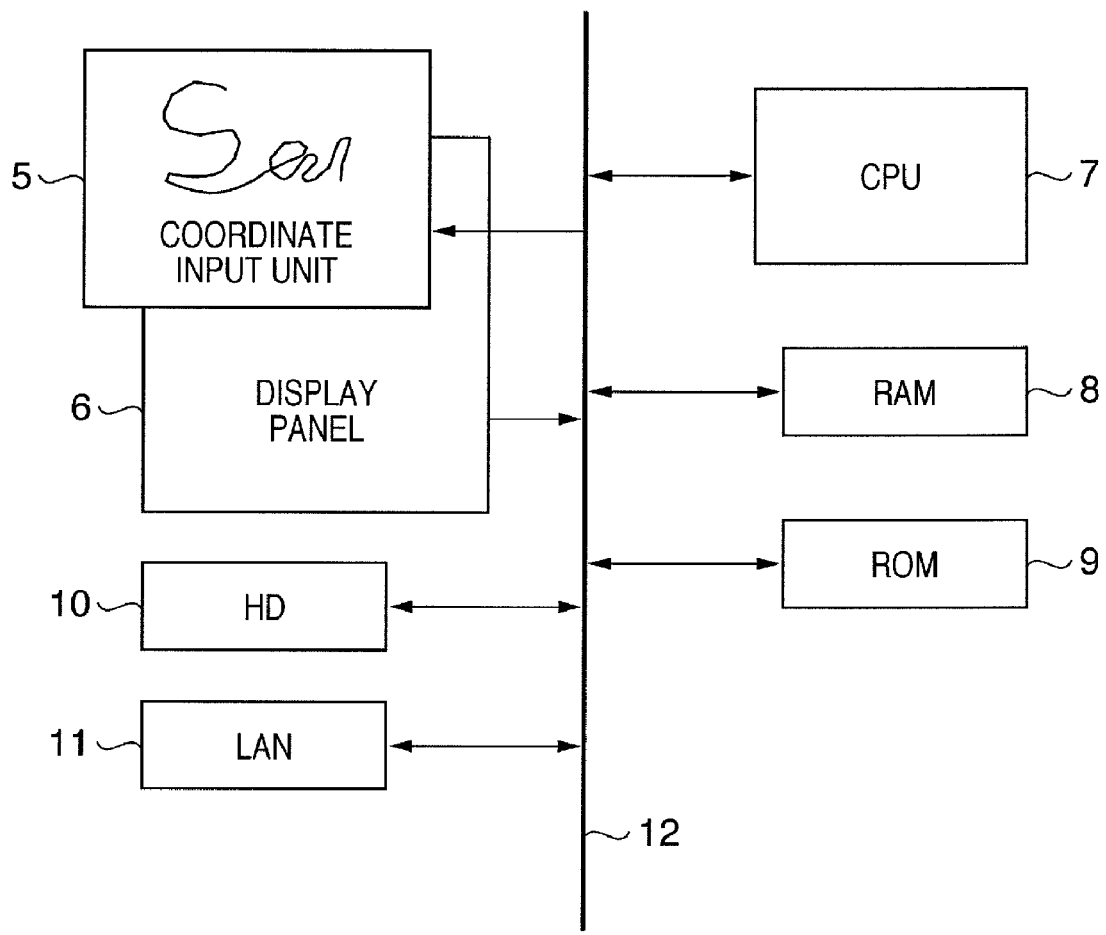
FIG. 2 is a block diagram of a signature authentication device according to a first embodiment of the present invention.

FIG. 2 is a block diagram showing an internal configuration of the signature authentication device 1. The input display unit 2 includes a coordinate input unit 5 and a display panel 6. The signature authentication device 1 also includes a CPU 7, a RAM 8, a ROM 9, and a hard disk (HD) 10. The coordinate input unit 5 is constituted by a transparent resistive digitizer and the like, and is connected to the CPU 7 via a system bus 12. The display panel 6 is constituted by an LCD display element, an LCD control circuit and a display memory, and connected to the CPU 7 via the system bus 12. Image display is executed by instructions from the CPU 7.

The CPU 7 is connected to the RAM 8 and the ROM 9 via the system bus 12, and performs processing operations using programs stored in the ROM 9.

The RAM 8 is used as a work area. The ROM 9 stores data and programs used in processing to evaluate signature data when registering a signature, and processing to display advice or the like when signature data is re-inputted after being evaluated. The HD 10 stores a registered signature data dictionary, general files, configuration information and the like. The signature authentication device 1 further includes an interface card 11 for connecting to a local area network. This is used to communicate with other personal computers.

Figure 3:
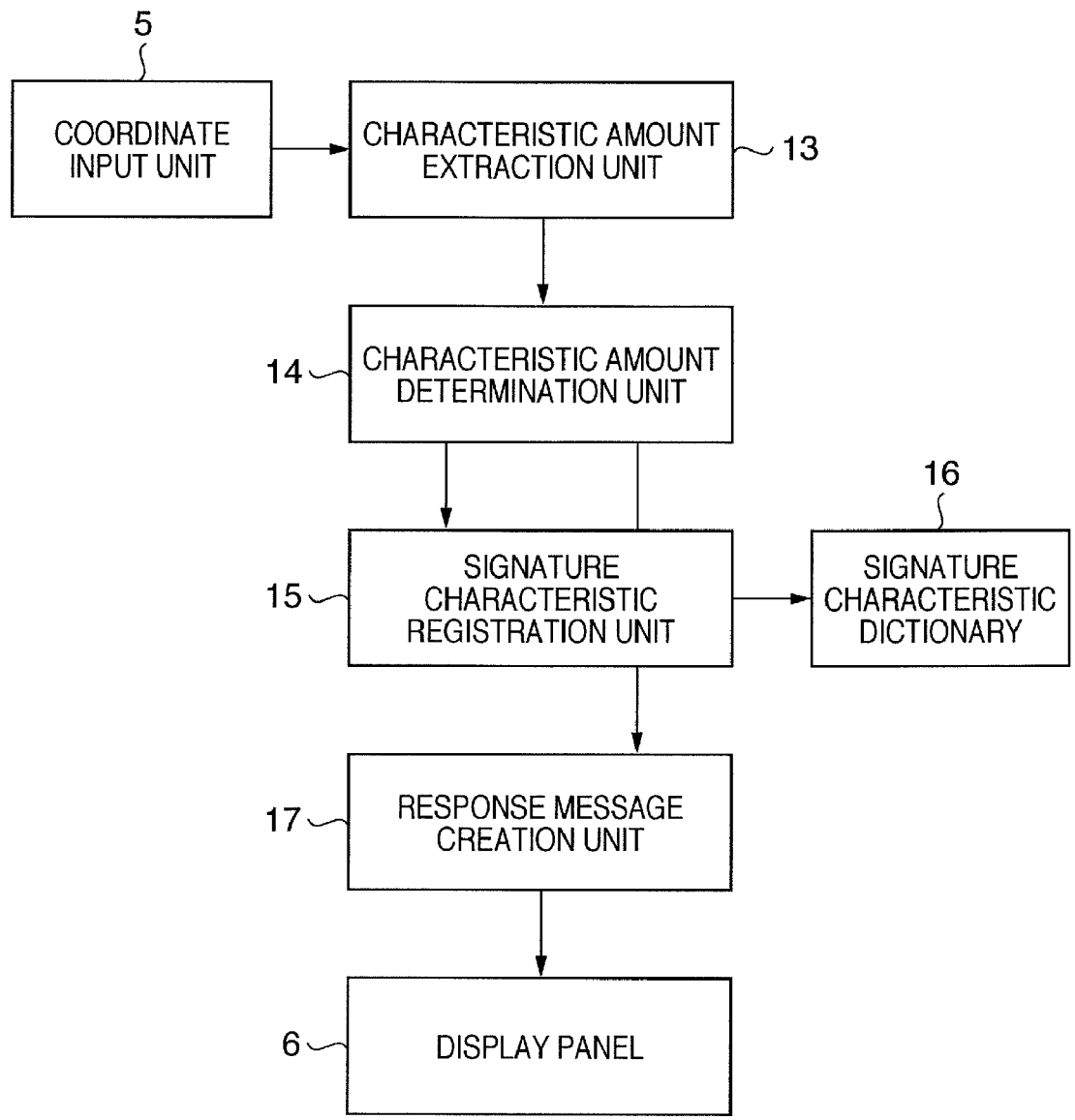
FIG. 3 is a functional block diagram of the signature authentication device according to the first embodiment of the present invention.

FIG. 3 is a functional block diagram of the signature authentication device according to an embodiment. The locus (XY coordinate string) traced in the input area of the coordinate input unit 5 is input as the locus of a handwritten signature. A characteristic amount extraction unit 13 extracts characteristic amounts used in signature authentication from the XY coordinate data input by the coordinate input unit 5. The extracted characteristic data is sent to a characteristic amount determination unit 14 and a signature characteristic registration unit 15.

The characteristic amount determination unit 14 determines whether to permit signature registration by comparing, for each of a plurality of characteristic amounts, the extracted characteristic data with a reference value determined by a statistical method or the like from previously collected signature data of a plurality of people. If signature registration is refused, the characteristic amount determination unit 14 sends the type and value of the characteristic amount to a response message creation unit 17. The signature characteristic registration unit 15 registers the extracted characteristic data sent from the characteristic amount extraction unit 13, the user ID of the user who input the signature, and the coordinate data for the locus of the input signature in a signature characteristic dictionary 16.

The signature characteristic dictionary 16 records the characteristic data of registered signatures by user ID of those who input the signatures. The signature characteristic dictionary 16 is constructed within a specific file of the HD 10 in FIG. 2. The response message creation unit 17 creates a text message showing a response method that reflects the type and value of the characteristic amount sent from the characteristic amount determination unit 14. The display panel 6 displays the text message created by the response message creation unit 17.

Figure 4:
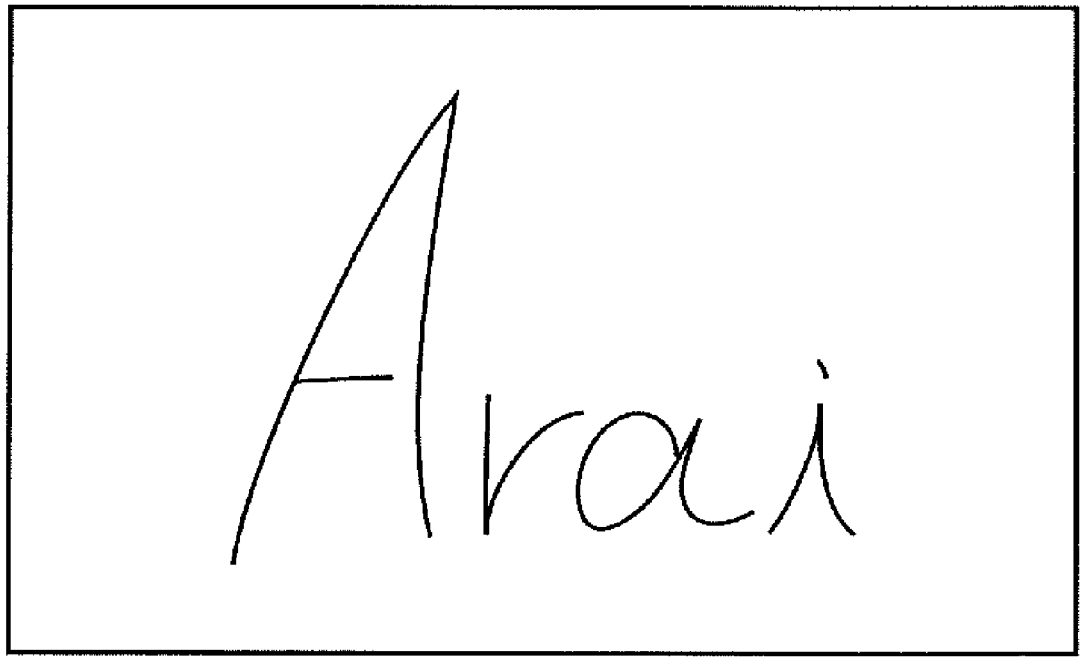
FIG. 4 shows an exemplary display of an input signature.
Figure 5:
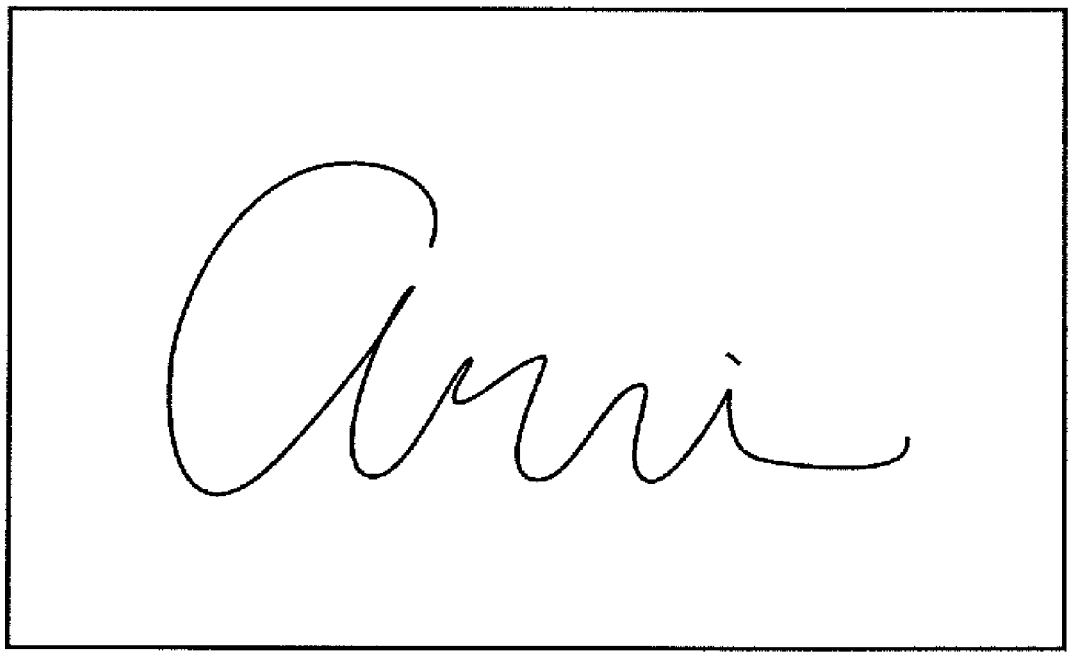
FIG. 5 shows an exemplary display of an input signature.

FIGS. 4 and 5 show exemplary trajectories of input signatures. FIG. 6 is a table showing characteristic conditions of signature trajectories and response messages corresponding to the characteristic conditions. A characteristic condition 1 relates to a cumulative angle change value of the strokes. If the written signature is constituted only by straight lines, the cumulative angle change value will be small. The signature locus shown in FIG. 4, for example, equates to characteristic condition 1, since many of the strokes consist of straight lines, and the cumulative angle change value is therefore small. When the cumulative angle change value is small, there is a possibility of the signature being copied if it is revealed to a malicious third party. Thus, the message displayed in this case is, "Your signature has many straight lines and is therefore easily copied." When the signature locus is in a running style as shown in FIG. 5, the possibility of the signature being copied is greatly reduced due to the way the characters are joined together and the changes in speed with which they are written.

A characteristic condition 2 relates to a writing speed change value of the strokes. For example, the speed change value will be small if the signature is written at a constant speed. Since a signature written at a constant speed is easily copied, registration in this case is refused. An appropriate response would be to write straight lines quickly, and write curves, inflection points and end points slowly. Consequently, the message displayed in this case is, "Writing at a constant speed makes your signature easier to copy."

A characteristic condition 3 relates to the degree of difference in the shape of the characters from a standard pattern. For example, the degree of difference will be small when the signature is written in a standard way. Signature authentication may thus be successful if a malicious third party knows the characters used in the signature and writes the signature in the anticipated way. Consequently, the user is advised to write in a running or cursive style. Specifically, the message displayed in this case is: "Your writing style is close to a standard dictionary style. Please try using different characters or a different style of writing."

A characteristic condition 4 relates to the degree of difference in the relative size of the characters. The signature locus is more difficult to predict if the size of the characters is different. Therefore, the user is advised to write the character in different sizes. Specifically, the message displayed in this case is, "Varying the size of the characters will make your signature more difficult to predict."

A characteristic condition 5 relates to the degree of difference in the positioning of the characters. The signature locus is more difficult to predict if the positioning of the characters is varied. In view of this, the message displayed in this case is, "Varying the positioning of the characters will make your signature more difficult to predict."

While five characteristic conditions are described in the present embodiment, any of these five characteristic conditions may be used alone, or two or more of the characteristic conditions may be used in combination.

FIG. 7 shows an exemplary signature registration screen. The reference numeral 18 denotes a signature input area. When a locus is input in this area using a pen, the coordinate data of the locus is passed on for use in a signature registration process. The reference numeral 19 denotes a Register button. Pressing this area with a pen starts processing to register the locus data written in the signature input area 18. The reference numeral 20 denotes a Clear button. Pressing this area with a pen clears the locus data written in the signature input area 18.

Figure 8:
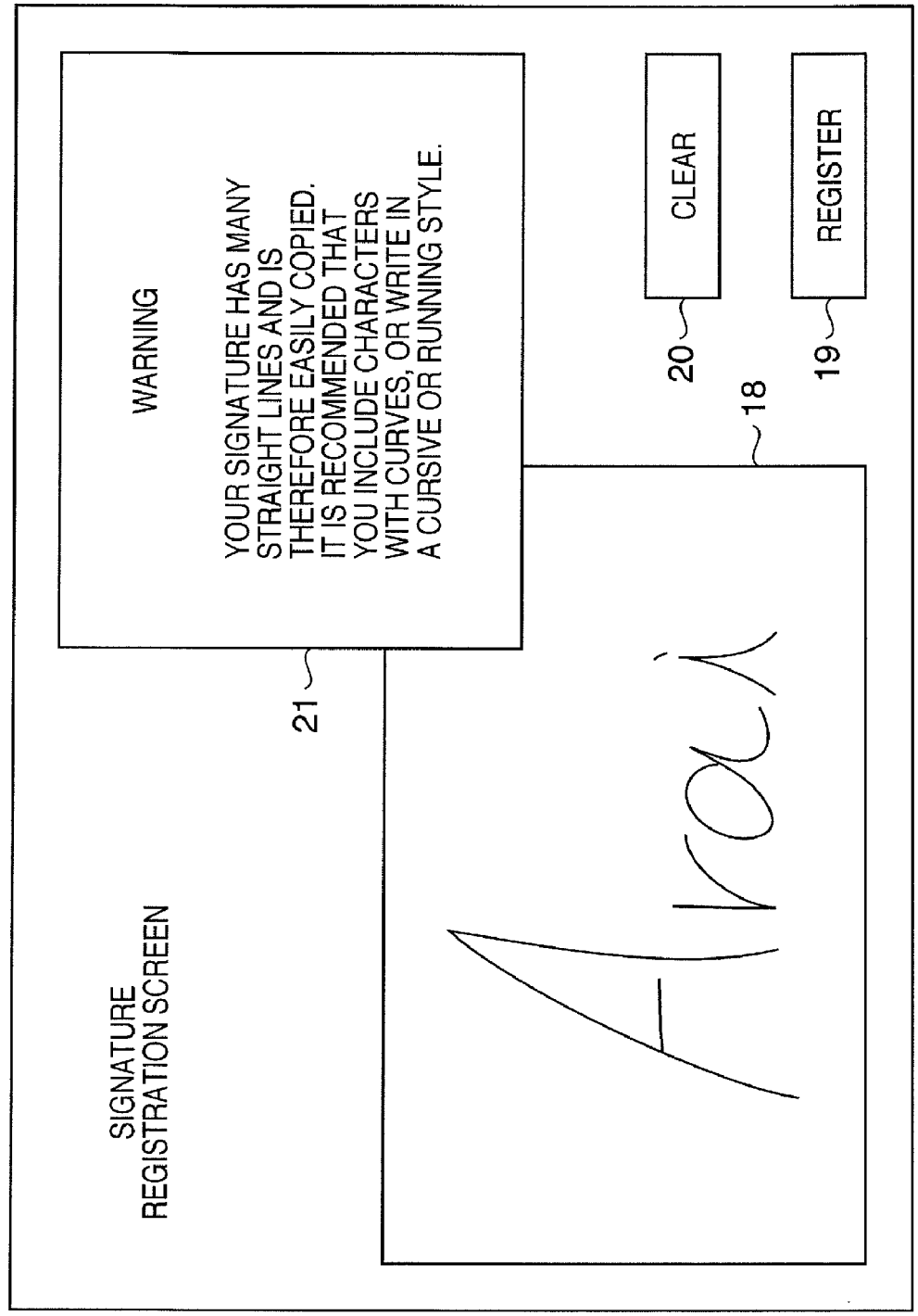
FIG. 8 shows an exemplary warning screen after signature data has been evaluated.

FIG. 8 shows an exemplary warning screen after signature data has been evaluated. When the Register button 19 is pressed, the CPU 7 of the signature authentication device 1 firstly evaluates the locus data written in the signature input area 18. If the locus is evaluated as not being suitable for registration, a warning message 21 that depends on the characteristics of the locus is displayed.

Figure 9:
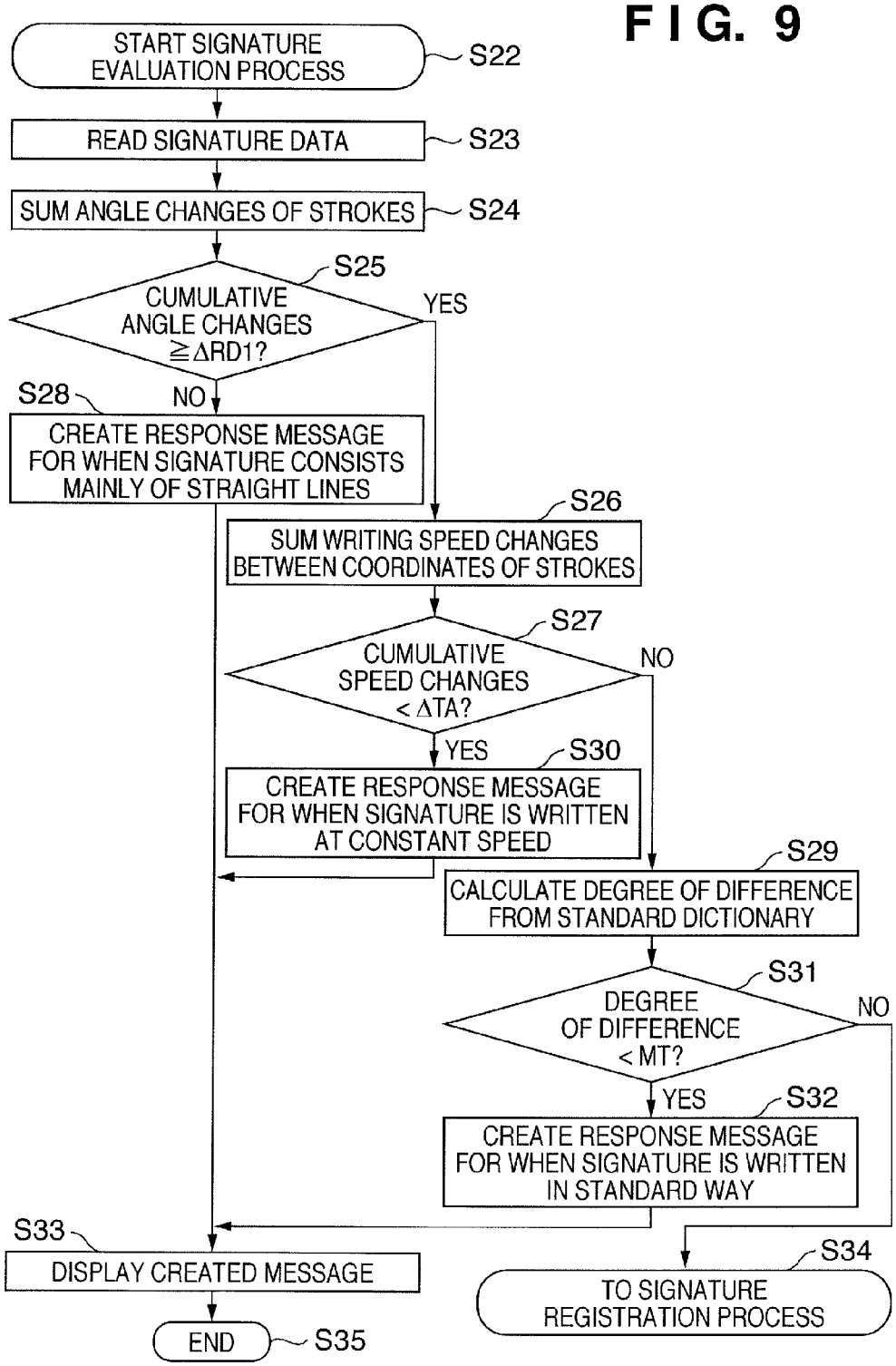
FIG. 9 is a flowchart showing a signature evaluation process according to an embodiment.
Figure 10:
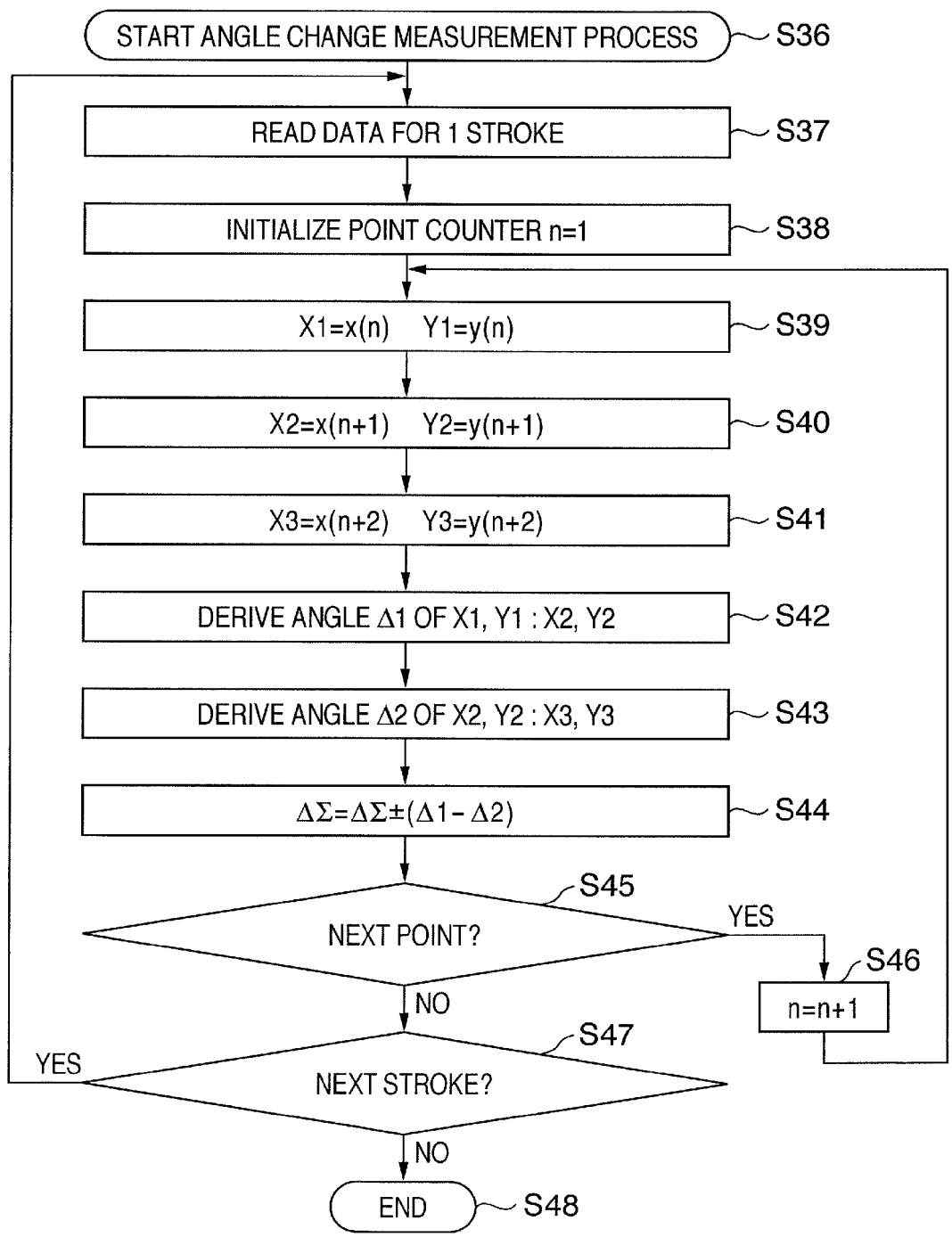
FIG. 10 is a flowchart showing an angle change measurement process according to an embodiment.

FIG. 9 is a flowchart showing a signature evaluation process according to an embodiment. FIG. 10 is a flowchart showing an angle change measurement process according to an embodiment. These processing operations will be described with reference to the flowcharts of FIGS. 9 and 10.

In step S22, the signature evaluation process is started. A work area is secured and variables are initialized. In step S23, the XY coordinate string of signature data constituted by a plurality of strokes is stored in a signature data buffer. Specifically, the locus data written in the signature input area 18 of FIG. 7 is stored in a signature data storage area when the Register button 19 is pressed. The coordinate data of the locus is produced by a digitizer, which is a common coordinate input device. The XY coordinate data is determined at a sampling rate of 100 points/sec, for example. Some devices can also determine pen pressure information using a digitizer, in which case pen pressure information is additionally used to determine the XY coordinate data. Further, those devices that can also determine coordinates in space use space coordinate data between the locus data of the individual strokes to determine the XY coordinate data.

In step S24, the cumulative angle changes for each stroke are summed. The cumulative angle change value is small if the strokes consist of straight lines, and large in the case of a signature constituted by a large number of curves. Although it may not always be possible to write completely straight line due to small input noise depending on the capability of the digitizer, the processing is configured to ignore these kinds of small changes as errors.

In step S25, processing is performed to determine whether the cumulative angle changes of the locus data derived in step S24 is greater than or equal to a specified value $\Delta RD1$. If so, processing proceeds to step S26, and if not, processing proceeds to step S28. The specified value $\Delta RD1$ is prescribed by tests that involve seeing to what extent sample signature data of several people can be copied, for instance. A configuration in which the user is able to set the specified value $\Delta RD1$ within a given range can also be easily realized.

In step S26, the changes in writing speed between the coordinate points of the strokes are summed. Here, "coordinate point" indicates the position of the pen at fixed time intervals. Specifically, the distance between each pair of coordinate points from the start point to the end point of each stroke is compared with the distance between the next pair of coordinate points, and the differences are summed. Small differences are not included, however. Once the differences in distance for one stroke have been summed, the next stroke is processed, and a cumulative speed change value is then derived by summing the differences in distance for all strokes.

In step S27, processing is performed to determine whether the cumulative speed change value of the signature data is less than a specified value $\Delta T$. If so, processing proceeds to step S30, and if not, processing proceeds to step S29. The specified value $\Delta T$ is prescribed by tests that involve seeing to what extent sample signature data of several people can be copied, for instance. Specifically, the specified value $\Delta T$ is prescribed by taking statistics from test data and the authentication result thereof, and also from copied sample data and the authentication result thereof. A configuration in which the user is able to set the specified value $\Delta T$ within a given range can also be easily realized. Correcting the specified value $\Delta T$ based on the registered signature data can also be easily done. In a system capable of registering a plurality of users, for example, the specified value $\Delta T$ can be modified upon comparison with the smallest cumulative speed change value in the registered signature data. If the smallest value is around 1.5 times larger than the specified value $\Delta T$, a new specified value $\Delta T$ is set at the smallest value multiplied by 0.9.

In step S28, a response message is created for when the input signature consists mainly of straight lines. The message created in this case is the response message for characteristic condition 1 shown in the table of FIG. 6: "Your signature has many straight lines and is therefore easily copied. It is recommended that you include characters with curves, or write in a cursive or running style." The text code for this response message stored in the ROM 9 of FIG. 2 in association with characteristic condition 1 is read and stored in a response message buffer.

In the case where the signature data consists of straight lines and curves, a configuration in which straight line portions are highlighted after the signature data has been evaluated is also considered possible. The color of straight line portions of the locus written in the signature input area 18 of FIG. 7 may be highlighted by a change in color to suggest that these portions be modified. In step S29, the signature data is matched with entries in a standard dictionary, and the degree of difference from a standard pattern is calculated. This process is similar to common character recognition. In other words, registering a signature written in the normal way opens up the possibility of the signature being copied if the character string registered as the signature is a word or the like that can be easily inferred. While authentication will be successful in the case of a password authentication system involving the input of text if the password is deciphered, the locus of a signature is considered impossible to infer provided that it is not written in the standard way, since there exist an infinite number ways of writing even the same word if the locus is handwritten.

As for the exemplary processing configuration, locus data input as signature data is separated into individual characters with a conventional character segmentation algorithm. The signature data "Arai" in FIG. 7, for example, is separated into the four characters "A", "r", "a" and "i". A character recognition process is then performed on each character. Specifically, the signature data is matched with standard dictionary patterns for the character "A" having the same number of strokes, and the degree of difference from the standard patterns is calculated. If the degree of difference is low, there is a possibility of an inferred signature being authenticated, since the writing style is similar to a standard pattern. If the writing style is not included among the standard patterns, the degree of difference will be high, and there is virtually no possibility of an inferred signature being authenticated.

In the case where the degree of difference from the standard pattern is low, it is also possible to match the character string of the recognition result with entries in a word dictionary. If the character string matches a word or a proper noun the possibility of an inferred signature being authenticated is considered to be very high. Alternatively, it is possible to perform a process that returns an error the higher the degree of probability given by a character transition probability dictionary.

In step S30, a response message is created for when a signature is written at a constant speed. The message in this case is the response message for characteristic condition 2 shown in the table of FIG. 6: "Writing at a constant speed makes your signature easier to copy. Please try varying your writing speed."

Further, it may happen that some of the characters of the signature data may be written at a varied speed, while others are written at a constant speed. In this case, it is possible to suggest a better writing style by highlighting only the characters written at a constant speed. Assume, for example, that the "A" part of the signature "Arai" in the signature input area 18 of FIG. 7 was written at a constant speed. The locus is displayed in black when the signature data is input, before the cumulative speed change is evaluated in step S27. Any character whose cumulative speed change value is close to zero is redrawn in red. With the "Arai" example, the character "A" is redrawn in red, while the "r", "a" and "i" remain in black. A message such as the following is displayed to inform the user of the appropriate response: "Please rewrite the red character (s), in a manner similar to that used when writing the black character(s)." The text code for this response message stored in the ROM 9 of FIG. 2 in association with characteristic condition 2 is read and stored in the response message buffer.

In step S31, processing is performed to determine whether the degree of difference of each character from a standard pattern is less than a threshold value MT. If so, processing proceeds to step S32, and if not, processing proceeds to step S34. While the threshold value MT is dependent on the standard patterns and the character recognition algorithm used in step S29, basically if the signature data is normally recognized, the degree of difference will be less than the threshold value MT since the signature data is similar to a standard pattern. Recognition is performed using sample signature data and standard patterns, and the threshold value MT is determined statistically. If a character recognition algorithm for abbreviated forms and running or cursive style is used, it is possible to limit the standard patterns to only standard styles of writing by changing the processing mode in the algorithm or the dictionary.

In step S32, a response message is created for when the signature data is similar to a standard pattern. The message displayed in this case is the response message for characteristic condition 3 shown in the table of FIG. 6: "Your writing style is close to a standard dictionary style. Please try using a different style of writing, such as a cursive or running style." The text code for this response message stored in the ROM 9 of FIG. 2 in association with characteristic condition 3 is read and stored in the response message buffer.

Further, if the signature data includes two or more characters, any character written in a standard pattern may be displayed differently from the other characters. For example, if the "A" in "Arai" is written in a running style with one stoke, while the "r" is written normally with one stroke, the "r" is highlighted since the writing style of "r" with one stroke conforms to a standard pattern. After performing character recognition for each character, processing is thereby performed to determined for each character whether the degree of difference from a standard pattern is less than the threshold value MT, and if so, the locus of that character is redrawn in a color different from the other characters.

In step S33, the created message is displayed. Specifically, a common popup window as denoted by reference numeral 21 in FIG. 8 is created, and the response message created in step S28, which is the text code stored in the response message buffer, is displayed in the popup window. Pressing outside this popup window with a pen closes the window.

In step S34, processing proceeds to signature registration. If all of the signature registration conditions are met, the signature evaluation process is ended, and the signature registration process is started.

The example given in the flowchart of FIG. 9 was described using characteristic conditions 1, 2 and 3 in the table of FIG. 6. Characteristic conditions 4 and 5 in the table of FIG. 6 can be similarly added to this processing flow.

In the case of characteristic condition 4, processing to detect the degree of difference in the relative size of the characters is performed instead of step S29, for example. Firstly, locus data input as signature data is separated into individual characters with a conventional character segmentation algorithm. The signature data "Arai" in FIG. 7, for example, is separated into the four characters "A", "r", "a" and The circumscribed rectangle of each of the characters "A", "r", "a" and "i", and the area of each circumscribed rectangle are derived. The areas of the characters are then compared, and the difference is detected as the degree of difference in size. The degree of difference will be small if the characters are written with the same size, and large if the characters are written with varying sizes. If the degree of difference is less than a prescribed threshold, processing proceeds to step S32, where the message stored in the response message buffer is the response message for characteristic condition 4 in the table of FIG. 6: "Varying the size of the characters will make your signature more difficult to predict."

In the case of characteristic condition 5, processing to detect the degree of difference in the center positions of the characters in the Y-axis direction is performed instead of step S29, for example. Firstly, locus data input as signature data is separated into individual characters with a conventional character segmentation algorithm. The signature data "Arai" denoted by the reference numeral 18 in FIG. 7, for example, is separated into the four characters "A", "r", "a" and "i".

The circumscribed rectangle of each of the characters "A", "r", "a" and "i", and the Y coordinate of the center position of each circumscribed rectangle are derived. The differences between the Y coordinates of the characters are then calculated and summed. If the characters are written neatly beside each other as in FIG. 7, the differences will usually be small. If the difference is small, processing proceeds to step S32, where the message stored in the response message buffer is the response message for characteristic condition 5 in the table of FIG. 6: "Varying the positioning of the characters will make your signature more difficult to predict."

An angle change measurement process will be described next using the flowchart of FIG. 10.

In step S36, the angle change measurement process is started. A work area is secured, and $\Delta\Sigma$ is initialized to 0. In step S37, the XY coordinate string for one stroke is read to the signature data buffer. Specifically, the locus of the signature data is sequentially read in the order in which it was input. In step S38, the coordinate point counter is initialized to 1. Specifically, n=1.

In step S39, processing is performed to read the n-th XY coordinate of the stroke read at step S37. Here, the n-th XY coordinate is given by X1=x(n), Y1=y(n). In step S40, processing is performed to read the next point, which is the n+1-th XY coordinate in this case. Here, the n+1-th XY coordinate is given by X2=x(n+1), Y2=y(n+1). In step S41, processing is performed to read the next point, which is the n+2-th XY coordinate in this case. Here, the n+2-th XY coordinate is given by X3=x(n+2), Y3=y(n+2). In step S42, the angle formed by the X-axis and the straight line connecting (X1,Y1) and (X2,Y2) is derived. This involves using a general mathematical algorithm to derive the angle and storing the derived angle in $\Delta$1.

In step S43, the angle formed by the X-axis and the straight line connecting (X2,Y2) and (X3,Y3) is derived. This involves using a general mathematical algorithm to derive the angle and storing the derived angle in $\Delta$2. In step S44, the absolute value of the difference between the angles $\Delta$1 and $\Delta$2 is derived and added to the cumulative angle changes $\Delta\Sigma$. The angle change values of the locus can thereby be summed. In step S45, processing is performed to check whether the coordinate data of the next coordinate point n+3 exists in the read coordinate data. If all of the points in the read coordinate data have been processed, processing proceeds to step S47, while if one or more unprocessed coordinate points remain, processing proceeds to step S46. In step S46, the coordinate point counter is incremented. Specifically, n=n+1.

In step S47, processing is performed to check whether there is a next stroke. If there is a next stroke, the stroke counter is incremented and processing returns to step S37. If all the strokes have been processed, processing proceeds to step S48. In step S48, the angle change measurement process is ended. The work area is released, and the cumulative angle changes ΔΣ of the strokes is output.

Configuring the processing in this way enables signature data that is easily copied to be detected when a user is attempting to register a signature, based on the characteristic conditions of the locus. In an embodiment, the signature authentication device displays a response message prepared in advance for each characteristic condition, when easily copyable signature data is detected.

Also, in the case where a part of a signature is determined to be easily copyable, the characteristic conditions can be similarly measured for that part of the signature, and the easily copyable part highlighted in the display. The user is thereby able to register signature data that is difficult to copy by rewriting the signature with precision.

In an embodiment, the characters are displayed as a method of notifying messages, although the present invention is not limited to this. Messages may be given by audio or using other suitable methods.

According to an embodiment, processing is performed to determine whether to register a signature depending on the characteristics of input signature data, and if registration is refused, the user is notified of an appropriate response method that reflects those characteristics. Registration of a simple signature that is easily copyable is thereby effectively prevented, and the user is able to re-input a signature that will readily be accepted for registration. Security is bolstered and a user-friendly signature registration and authentication system can be provided.

In other words, how the signature should be written is presented to the user by displaying a specific message, as a response method that reflects the degree of complexity of individual characteristics. The user is thus able to more easily re-input a registerable signature.

An embodiment of the present invention may also be configured to enable the user to specify the evaluation thresholds used in signature registration. By providing a functionality for enabling a user to selectively change the degree of complexity thresholds for the characteristic conditions, an apparatus according to an embodiment is capable of registering reasonably simple signatures or refusing to register all but the most difficult signatures depending on the level of security designated by the user. Authentication of handwritten signatures can thereby be applied in a variety of environments.

Second Embodiment

A signature authentication device according to a second embodiment of the present invention will be described next. In the first embodiment, instructions are given in text form as to how the locus should be rewritten. This is adequate for users who can understand the message, but some users may not be able to understand the message.

In view of this, additional processing is performed in the second embodiment to select one of a plurality of processes for transforming signature data based on the characteristic conditions of the signature locus, and execute the selected transformation process. The signature locus is thereby transformed, and a sample of how the signature should be written is displayed for the user.

Figure 11:
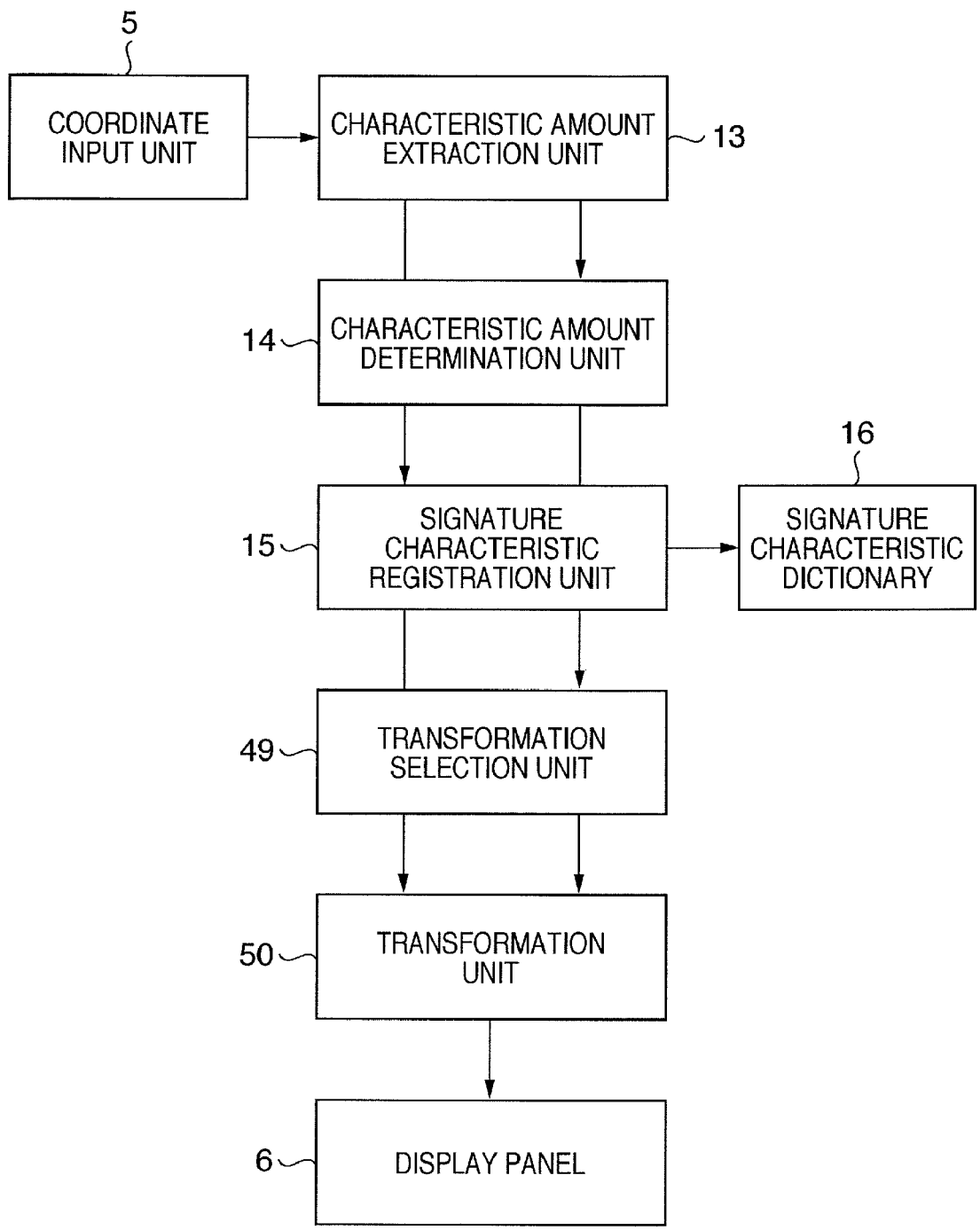
FIG. 11 is a functional block diagram of the signature authentication device according to a second embodiment.

FIG. 11 is a functional block diagram of the signature authentication device according to the second embodiment. Note that the same reference numerals are attached to constituent elements that are identical to FIG. 3, and related description is omitted. A transformation selection unit 49 decides the type of transformation to be performed on signature data from the type and value of the characteristic amount extracted by the characteristic amount determination unit 14.

A transformation unit 50 applies the transformation process selected by the selection unit 49 to the locus data and creates a sample signature. The created sample signature is then output to the display panel 6.

Figure 12:
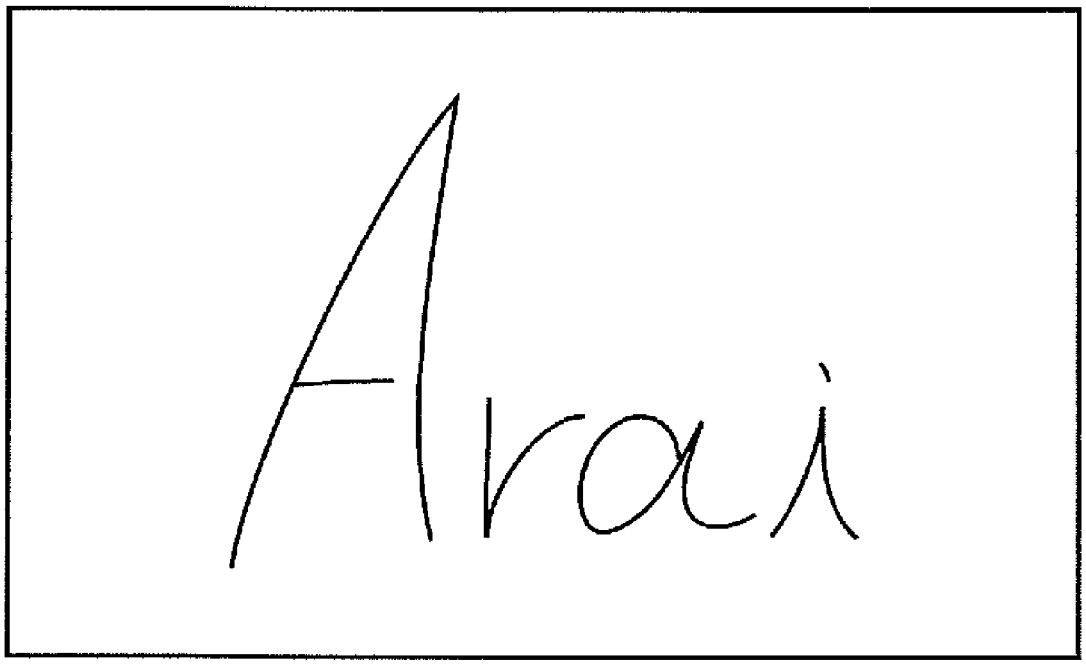
FIG. 12 shows exemplary input signature data.

FIG. 12 shows exemplary input signature data. FIG. 13 shows an example of the input signature data after having been transformed. FIG. 14 is a table showing characteristic conditions of signature trajectories and transformation methods corresponding to the characteristic conditions.

Characteristic condition 1 applies when the cumulative angle change value of the strokes is small. The transformation method in this case involves randomly connecting the strokes of the signature data, and randomly shifting points on the connecting lines within a given positional range. Characteristic condition 2 applies when there is little cumulative change in writing speed between the coordinate points of the strokes. The transformation method in this case involves removing coordinate points where they are densely packed, and adding coordinate points where they are sparse.

Characteristic condition 3 applies when there is little difference in shape from a standard pattern. The transformation method in this case involves randomly connecting the strokes, randomly shifting points on the connecting lines, and adding and removing coordinate points in order to randomly vary the distance between the points. Characteristic condition 4 applies when there is little difference in character size. The transformation method in this case involves randomly increasing or decreasing the size of the characters. Characteristic condition 5 applies when there is little difference in the positioning of the characters. The transformation method in this case involves randomly shifting the position of the characters.

Figure 17:
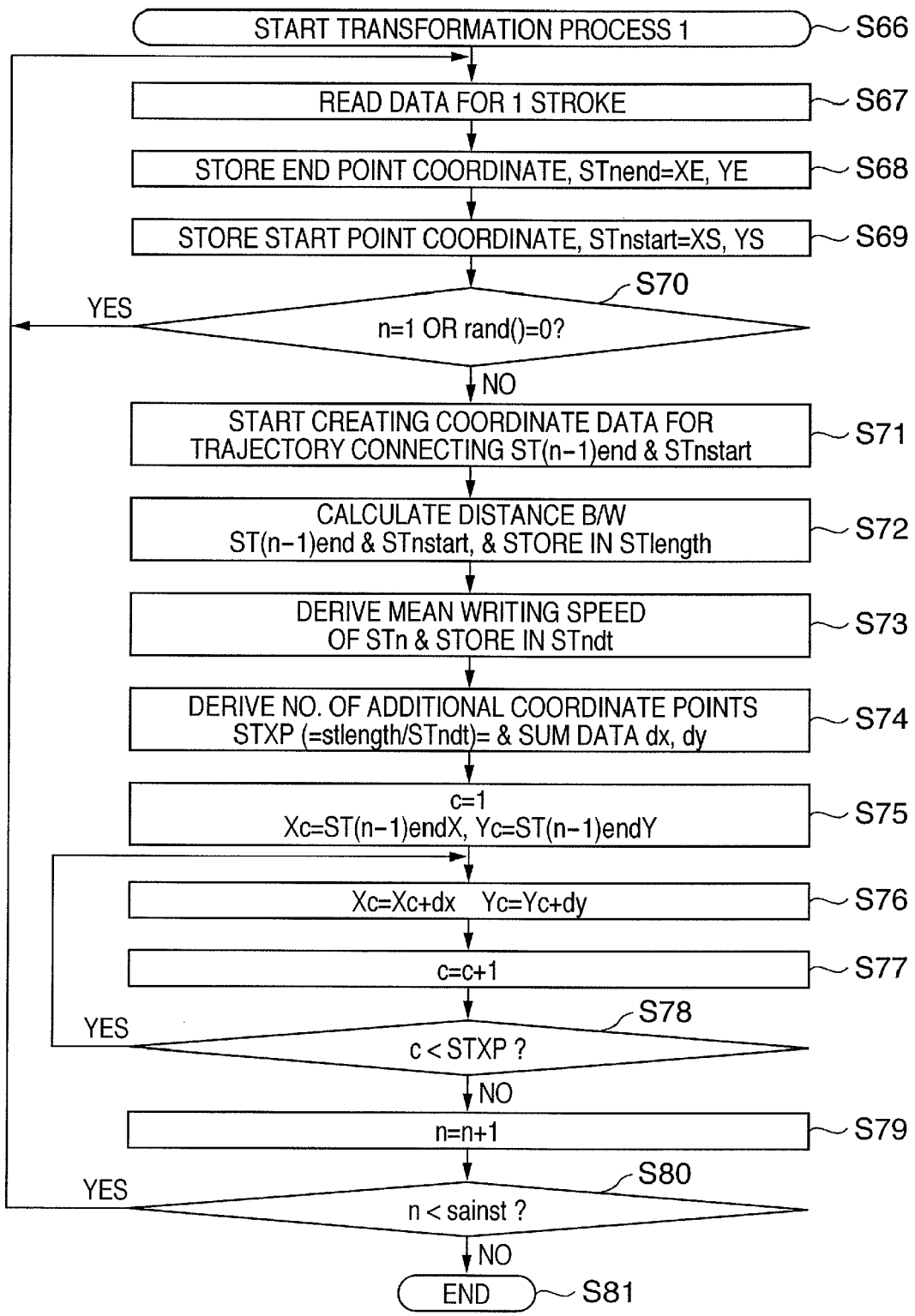
FIG. 17 is a flowchart showing a process performed by the signature authentication device according to the second embodiment.
Figure 18:
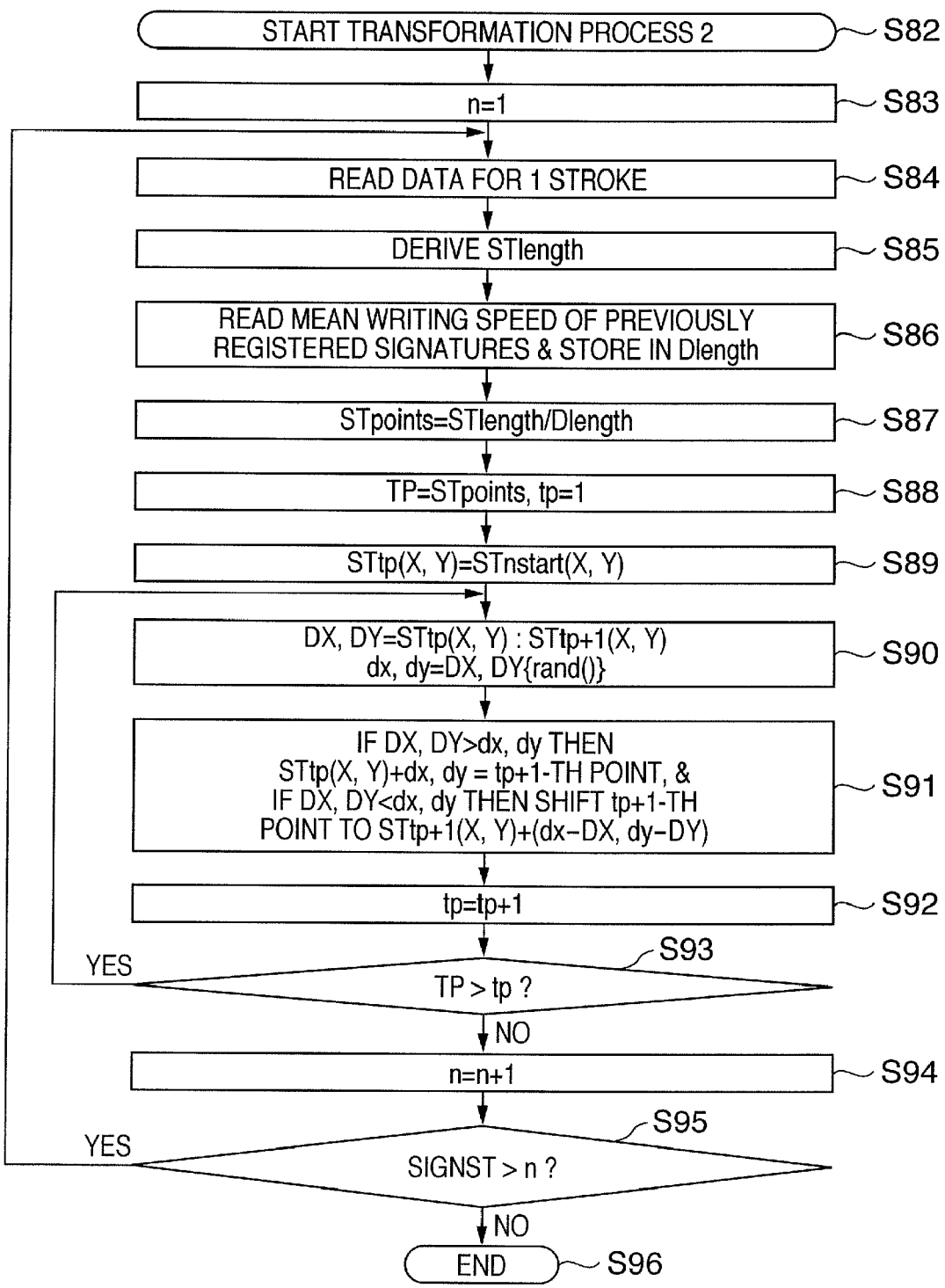
FIG. 18 is a flowchart showing a process performed by the signature authentication device according to the second embodiment.
Figure 19:
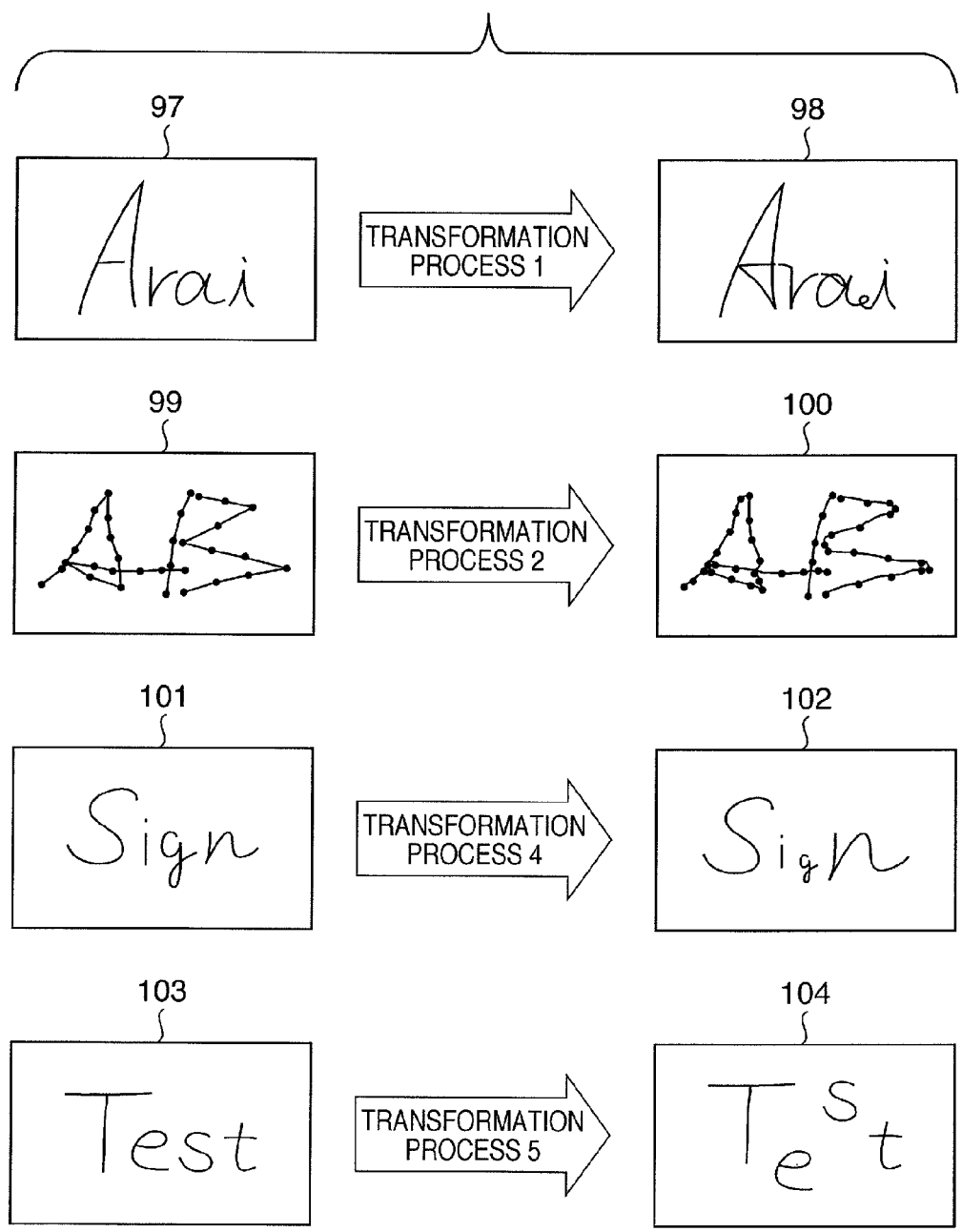
FIG. 19 shows an exemplary display of input signature trajectories and transformed sample signatures.

Various processes related to transforming signature data will be described with reference to the flowcharts of FIGS. 15, 16, 17 and 18. FIG. 19 shows an exemplary display of input signature trajectories and transformed sample signatures. Note that the same reference numerals are attached to processing that is identical to the flowchart of FIG. 9, and related description is omitted.

Firstly, in step S49, a transformation selection process is started. A work area is secured and variables are initialized. Next, having performed the processing of steps S23, 24 and 26, the degree of difference in the relative sizes of the characters is derived in step S50. Firstly, locus data input as signature data is separated into individual characters with a conventional character segmentation algorithm. The signature data "Arai" in FIG. 7, for example, is separated into the four characters "A", "r", "a" and "i".

The circumscribed rectangle of each of the characters "A", "r", "a" and "i", and the area of each circumscribed rectangle are derived. The areas of the characters are then compared, and the difference is detected as the degree of difference in size. The degree of difference will be small if the characters are written in the same size, and large if the characters are written in varying sizes. The sizes of the characters are thus derived, the differences are calculated, and the absolute values of the differences are summed.

In step S51, the degree of difference in the positioning of the characters is derived. Specifically, the degree of difference in the center positions of the characters in the Y-axis direction is detected. Firstly, locus data input as signature data is separated into individual characters with a conventional character segmentation algorithm. The signature data "Arai" in FIG. 7, for example, is separated into the four characters "A", "r", "a" and The circumscribed rectangle of each of the characters "A", "r", "a" and "i", and the Y coordinate of the center position of each circumscribed rectangle are derived. The differences between the Y coordinates of the characters are then calculated and summed. If the characters are written neatly beside each other as in FIG. 7, the differences will be small.

In step S52, processing is performed to determine whether the cumulative angle change value is greater than or equal to (specified value ΔRD1×security level). If so, processing proceeds to step S54, and if not, processing proceeds to step S53. The security level is a user setting value that enables the user to set the stringency of signature authentication. While setting the security level at a high level makes it difficult for a malicious third party to copy the user's signature, the user may occasionally have trouble getting their own signature authenticated. If authentication is frequently performed, the user may decide to lower the security level, since less stringent and more user-friendly authentication is preferable. Here, it is assumed that the highest and lowest security levels are 100% and 10%, respectively. The threshold of the characteristic amount is defined as (specified value ΔRD1×security level), so that this threshold also changes in response to the security level.

In step S53, processing is performed to determine whether the change in speed is less than (specified value ΔT×security level). If so, processing proceeds to step S58, and if not, processing proceeds to step S57. In other words, if the angle change value and the speed change value are both small, transformation process 3 is applied, while if the angle change value is small and the speed change value is large, transformation process 1 is applied.

In step S54, processing is performed to determine whether the speed change value is less than (ΔT×security level). If so, processing proceeds to step S56, and if not, processing proceeds to step S55. In other words, if the angle change value is large and the speed change value is small, transformation process 2 of step S56 is selected.

Figure 15:
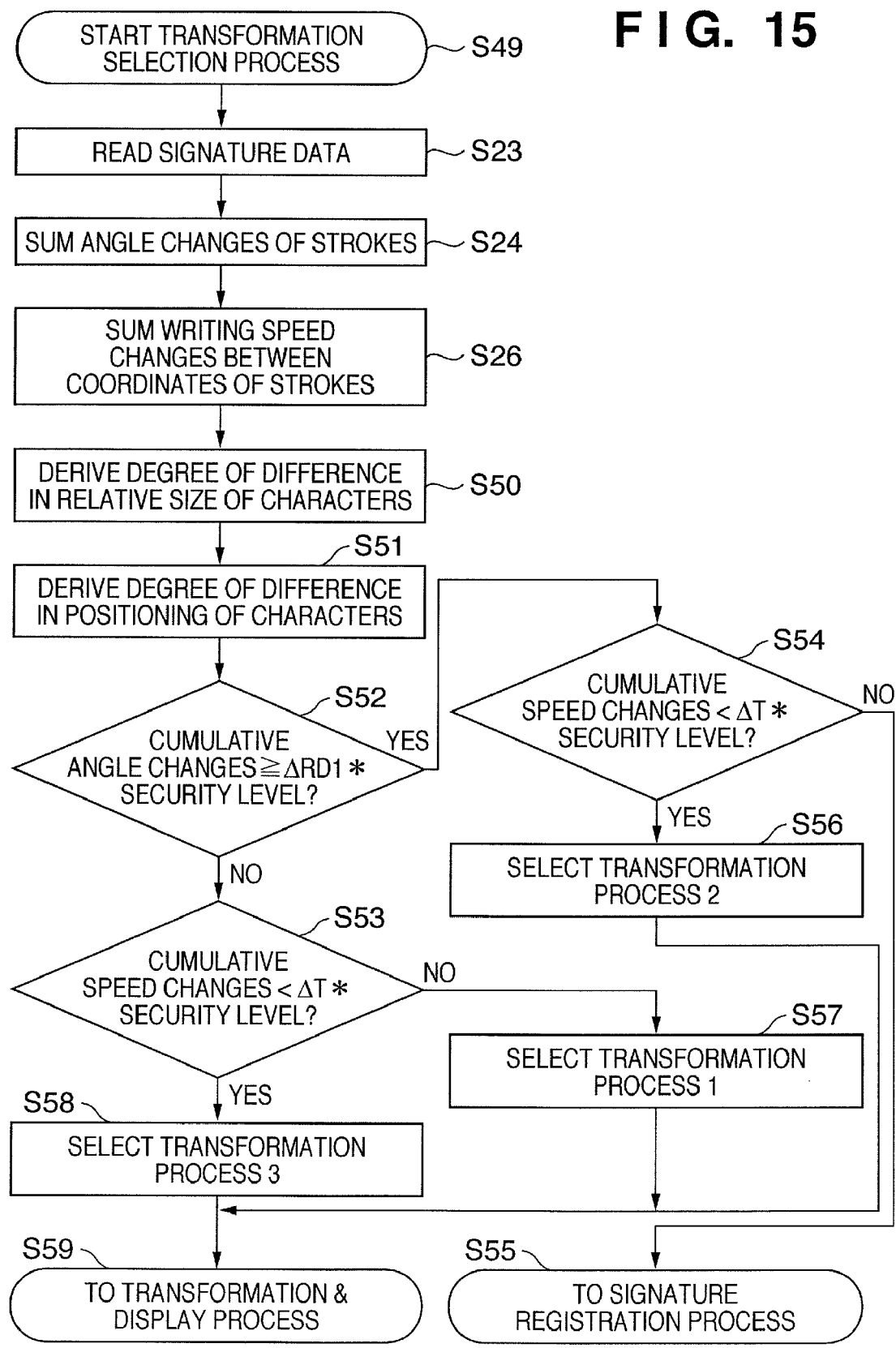
FIG. 15 is a flowchart showing a process performed by a signature authentication device according to the second embodiment.

In step S55, processing moves to signature registration. In other words, if it is determined from the characteristic amount of the locus that the signature data is difficult to copy, processing to register the signature data is executed. In step S56, transformation process 2 is selected, and the corresponding processing program is read to a processing program buffer. In step S57, transformation process 1 is selected, and the corresponding processing program is read to the processing program buffer. In step S58, transformation process 3 is selected, and the corresponding processing program is read to the processing program buffer. In step S59, the transformation selection process is ended, and processing moves to signature transformation and display. The work area used in the processing of FIG. 15 is also released at this time.

Figure 16:
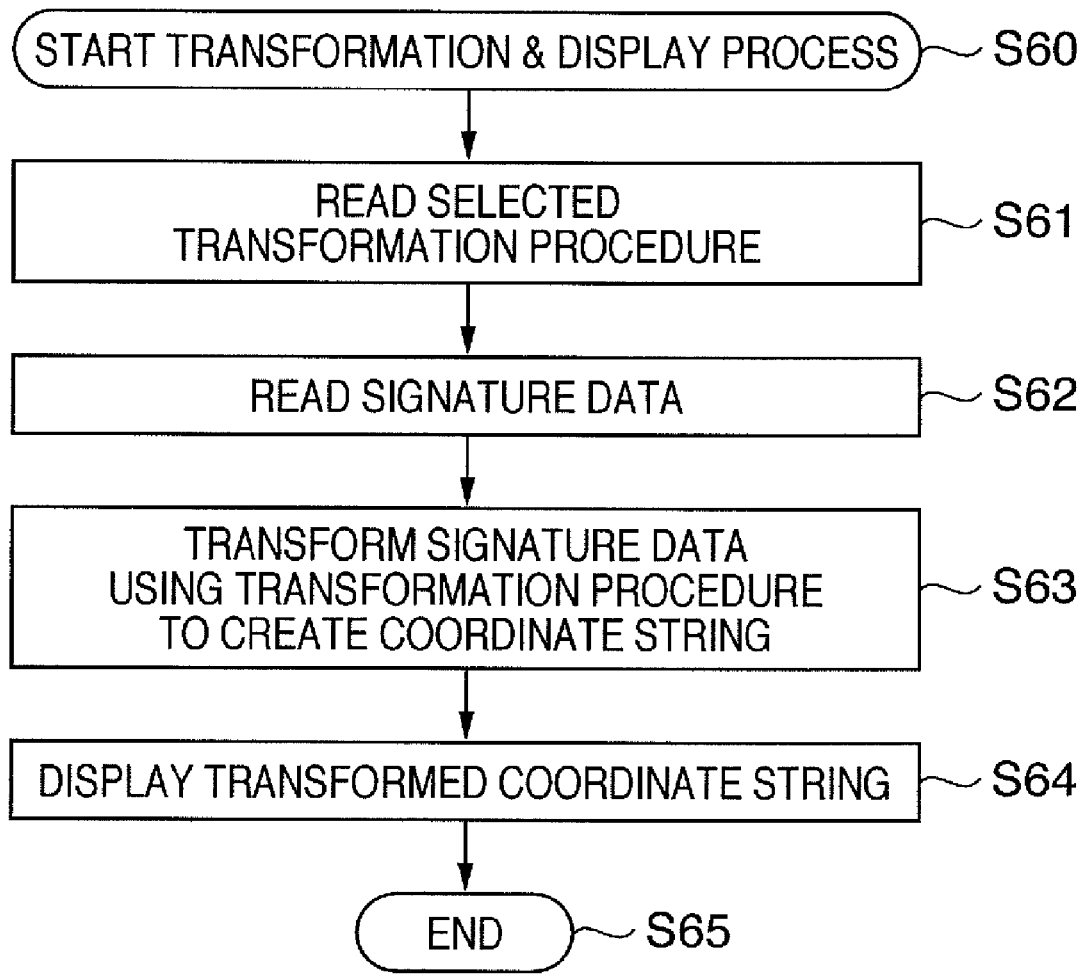
FIG. 16 is a flowchart showing a process performed by the signature authentication device according to the second embodiment.

The transformation and display process is described with reference to the flowchart of FIG. 16. In step S60, processing is started. A work area is secured and variables are initialized. In step S61, the processing procedure selected in step S56, 57 or 58 and stored in the processing program buffer is sequentially read.

Next, in step S62, input signature data is read. Specifically, the XY coordinate string of input signature data, such as "Arai" written in FIG. 7, is read to the signature data buffer. In step S63, the read signature data is transformed using the buffered processing procedure to create a coordinate string.

In step S64, the transformed coordinate string is displayed. Since the data structure of the transformed coordinate string is the same as the input coordinate string, the sample signature can be displayed in the signature input area 18 of FIG. 7, as the input signature data. Referring to FIG. 19, for example, the input signature data 97 is transformed using transformation process 1, and displayed as sample signature 98. Similarly, the input signature data 99 is transformed using transformation process 2, and displayed as sample signature 100. The input signature data 101 is transformed using transformation process 4, and displayed as sample signature 102. The input signature data 103 is transformed using transformation process 5, and displayed as sample signature 104. In step S65, processing is ended, and the secured work area is released.

Transformation process 1 will be described using the flowchart of FIG. 17. In step S66, processing is started. A work area is secured, and the stroke counter is initialized to 1. Specifically, n=1. In step S67, the n-th stroke data is read, and the XY coordinate string of the n-th stroke data is stored in the signature data buffer. In step S68, the end point coordinate of the n-th stroke is stored. Specifically, STnend=(XE,YE). In step S69, the start point coordinate of the n-th stroke is stored. Specifically, STnstart=(XS,YS). In step S70, if the stroke number n=1, then n=n+1 is set before returning to step S67, while if n≠1 and rand( )=0, processing also returns to step S67. On the other hand, if n≠1 and rand( )≠0, processing proceeds to step S71. This processing results in the end point of a stroke of a random number being connected to the start point of the locus of the next stroke.

In step S71, processing to create coordinate data for the locus connecting ST(n−1)end and STnstart is started. This involves adding locus data to the XY coordinate string between ST(n−1)end and STnstart. Specifically, one or more insertion positions are marked. In step S72, the distance between ST(n−1)end and STnstart is calculated, and stored in STlength. A general distance calculation equation may be used to calculate the distance between coordinate points. In step S73, the mean writing speed of STn is derived and stored in STndt. The distances of all coordinate points from the start point to the end point of the n-th stroke are summed, and the total length is divided by the number of coordinate points to derive the mean distance, which is taken as the mean writing speed.

In step S74, the number of additional coordinate points and the sum data dx, dy are derived. Specifically, the number of additional coordinate points STXP=STlength/STndt. Also, dx=(STnendX−ST(n−1)endX)/number of additional coordinate points, and dy=(STnendY−ST(n−1)endY)/number of additional coordinate points. In step S75, a creation point is initialized. Specifically, c=1, Xc=ST(n−1)endX, Yc=ST(n−1)endY. In step S76, a coordinate point is created, and stored in a creation buffer. Specifically, the coordinate point is stored in the creation buffer as Xc=Xc+dx, Yc=Yc+dy. If dx and dy are not changed, the points will be connected by a straight line. Adding random numbers such that Xc=Xc+dx(rand( )), Yc=Yc+dy(rand( )) enables a certain degree of fluctuation to be generated.

In step S77, the creation counter is incremented. Specifically, c=c+1. The next coordinate point is thereby created. In step S78, processing is performed to check whether creation of coordinate points has ended by determining if c<STXP. If creation has ended, processing proceeds to step S79, and if creation is ongoing, processing returns to step S76. In step S79, the new coordinate point data stored in the creation buffer is inserted in the one or more insertion positions stored at step S71. The stroke counter is then incremented in order to process the next stroke. Specifically, n=n+1.

In step S80, processing is performed to check whether all strokes have been processed. Specifically, n<signst. If n is not less than the number of input strokes, processing proceeds to step S81 since the processing has ended, while if n is less than the number input strokes, processing returns to step S67. In step S81, processing is ended. The work area is released, and the input signature data with new coordinate points inserted stored in the signature data buffer is output.

Transformation process 2 is described next using the flowchart of FIG. 18. In step S82, processing is started. A work area is secured and variables are initialized. In step S83, the stroke counter is initialized to 1. Specifically, n=1. In step S84, the n-th stroke data is read, and the XY coordinate string of the n-th stroke data is stored in the signature data buffer.

In step S85, the length of the read stroke is calculated. Specifically, the distances between the coordinate points of the stroke $\sqrt{((X1-X2)\times(X1-X2)+(Y1-Y2)\times(Y1-Y2))}$ are summed, and the derived distance is stored in STlength. In step S86, the mean writing speed of previously registered signatures is read. For example, the mean value derived from the valid signature data of a plurality of users and stored as an initial value in a registration dictionary is used at first. The initial value is then updated using newly registered signature data, and the updated value is used. The read mean writing speed is stored in Dlength.

In step S87, the number of new points is derived based on the previous mean writing speed. Specifically, STpoints=STlength/Dlength. In step S88, variables are initialized. Specifically, TP=STpoints, tp=1. In step S89, the value of the start point is firstly set in the coordinate point variable STtp(X,Y). Specifically, STtp(X,Y)=STnstart(X,Y).

In step S90, the distance vector between the start point STtp(X,Y) and the next point STtp+1(X,Y) is derived and stored in (DX,DY). The new direction vector (dx,dy) is derived from the current direction vector (DX,DY) and the mean writing speed Dlength. Next, based on the direction vector (dx,dy) of the new point, the rate is changed within a given range using a random function, and stored in (dx,dy).

In step S91, processing is performed to determine whether to create a new point or remove an existing point. The current pattern written too quickly is considered to result in a simple locus that is easily copy. Consequently, a sample that is difficult to copy is created by randomly providing new points to increase the number of points.

1: If the new point is smaller than the next existing point (i.e., (DX,DY)>(dx,dy)), a new coordinate point STtp(X+dx, Y+dy) is added as the tp+1-th point between the start point and the next existing point.

2: If the new point is larger than the next existing point (i.e., (DX,DY)<(dx,dy)), the next existing point (i.e., tp+1-th point) is removed, and a new next point is created as STtp+1 (X+dx-Dx, Y+dy-Dy).

While description is omitted here due to the complexity of the processing, a method is conceivable in which the overall shape of written signature trajectories is classified into a plurality of types, and a mean writing speed is stored for each shape type. The transformation method and the adaptive algorithms of the transformation processes are then changed according to the shape type of input signature data. This can be realized simply by adding a unit for classifying the overall shape of input signature data.

In step S92, the coordinate point counter is incremented. Specifically, tp=tp+1. In step S93, processing is performed to check whether all of the coordinate points of the read stroke have been processed. If so, processing proceeds to step S94, and if not, processing returns to step S89.

In step S94, the stroke counter is incremented. Specifically, n=n+1. In step S95, processing is performed to check whether the stroke counter value is less than the number of input strokes. Specifically, signst>n. If so, processing returns to step S84, and if not, processing proceeds to step S96. If the stroke counter value is less than the number of input strokes, this means that unprocessed strokes remain, so the next stroke is processed.

In step S96, processing is ended. The work area is released, and the newly generated stroke data is output. Transformation process 2 results in the input pattern 99 in FIG. 19 being transformed and displayed as sample signature 100.

Configuring the processing in this way enables a signature authentication device to be realized that transforms input signature data and displays a sample of how the signature should be written. Displaying a specific input sample enables the user to easily write a signature that is difficult to copy with precision when re-inputting signature data, thereby bolstering security.

Third Embodiment

Since no particular reference is made in the second embodiment to the method of displaying transformed signature data, still image display is assumed. However, reproducing the strokes with moving images would make it easier for the user to see how the transformed signature is written, since the timing and speed of the strokes is an important factor when inputting a locus. In view of this, the present embodiment adds a configuration for reproducing the strokes to the processing configuration of the second embodiment.

Figure 20:
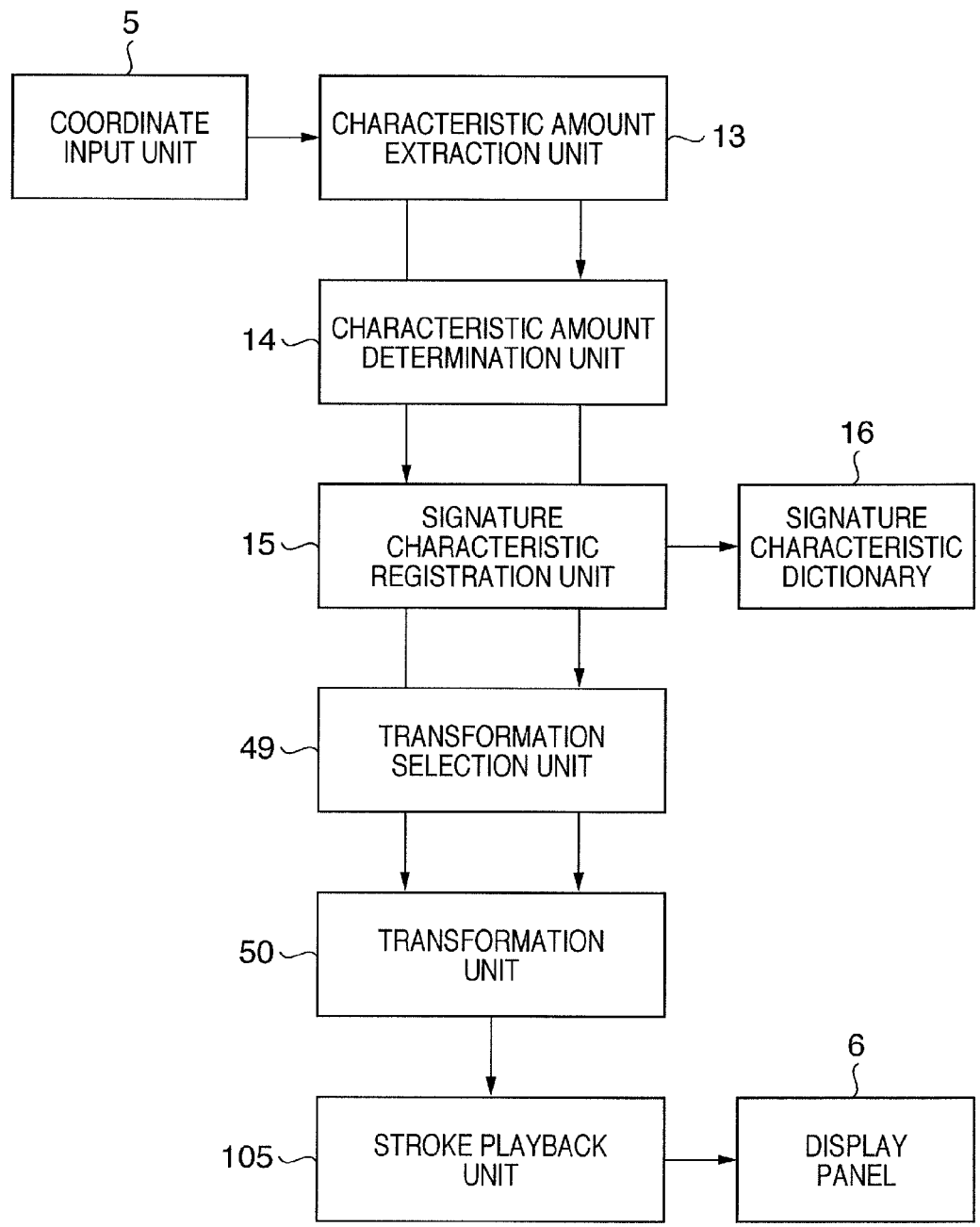
FIG. 20 is a functional block diagram according to a third embodiment.

FIG. 20 is a functional block diagram according to the third embodiment. Note that the same reference numerals are attached to constituent elements that are identical to FIG. 11, and related description is omitted. A stroke playback unit 105 reproduces the locus data transformed by the transformation unit 50 in real time based on the speed at which the signature data was input.

Figure 21:
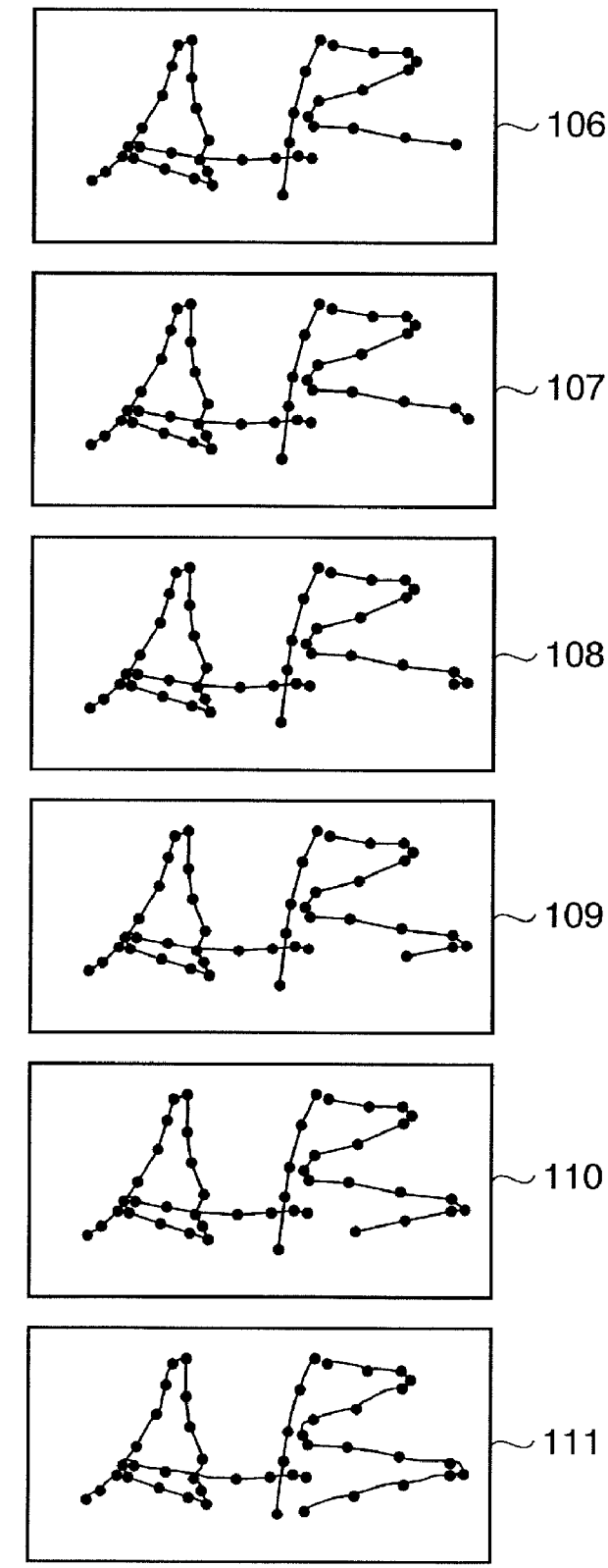
FIG. 21 shows an exemplary partial display of a transformed sample locus being reproduced with moving images.

FIG. 21 shows an exemplary partial display of a transformed sample locus being reproduced with moving images. The locus is drawn sequentially from 106 to 111. The black dots along the locus represent the coordinate points constituting the XY coordinate string. If the signature data was input, for example, with 0.1 second intervals between the coordinate points, the sample locus will also be reproduced with 0.1 second intervals between the coordinate points. Shorter straight lines will need to be drawn slowly and longer straight lines will need to be drawn quickly, so that there is 0.1 seconds before the next coordinate point.

Figure 22:
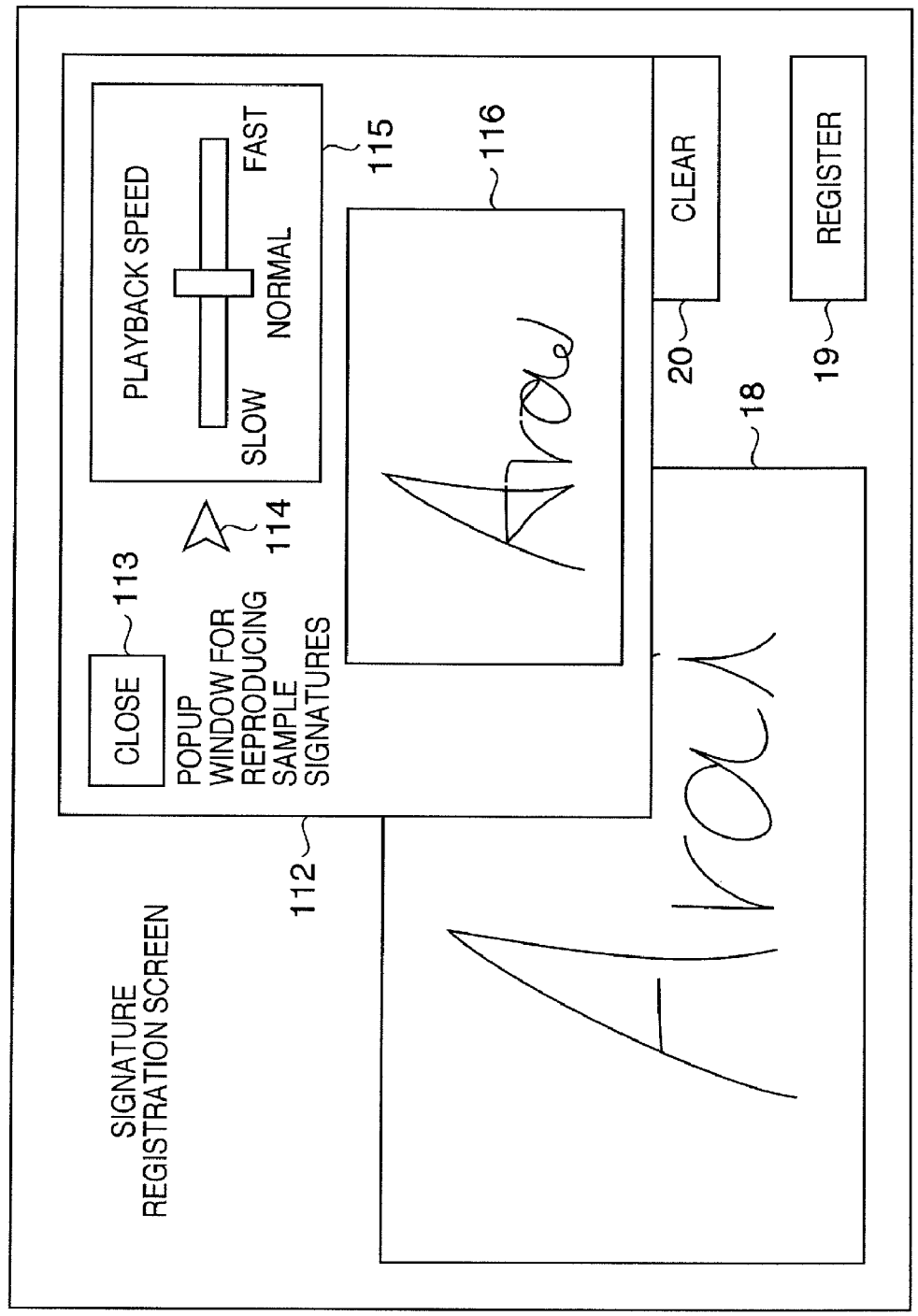
FIG. 22 shows an exemplary playback screen.

FIG. 22 shows an exemplary playback screen. The reference numeral 112 denotes a popup window for reproducing sample signatures. The reference numeral 113 denotes a Close button for closing the popup window 112. Pressing this area with a pen closes the window.

The reference numeral 114 denotes a Play button enabling playback of a sample signature to be started and stopped. Pressing this area with a pen starts playback when playback is not being executed, and stops playback when playback is currently being executed.

The reference numeral 115 denotes a playback speed setting bar. Pressing down and moving the bar with a pen enables the playback speed to be set to half speed, normal speed, or double speed. The reference numeral 116 denotes a playback area in which display is performed at half the size of the actual locus.

Figure 23:
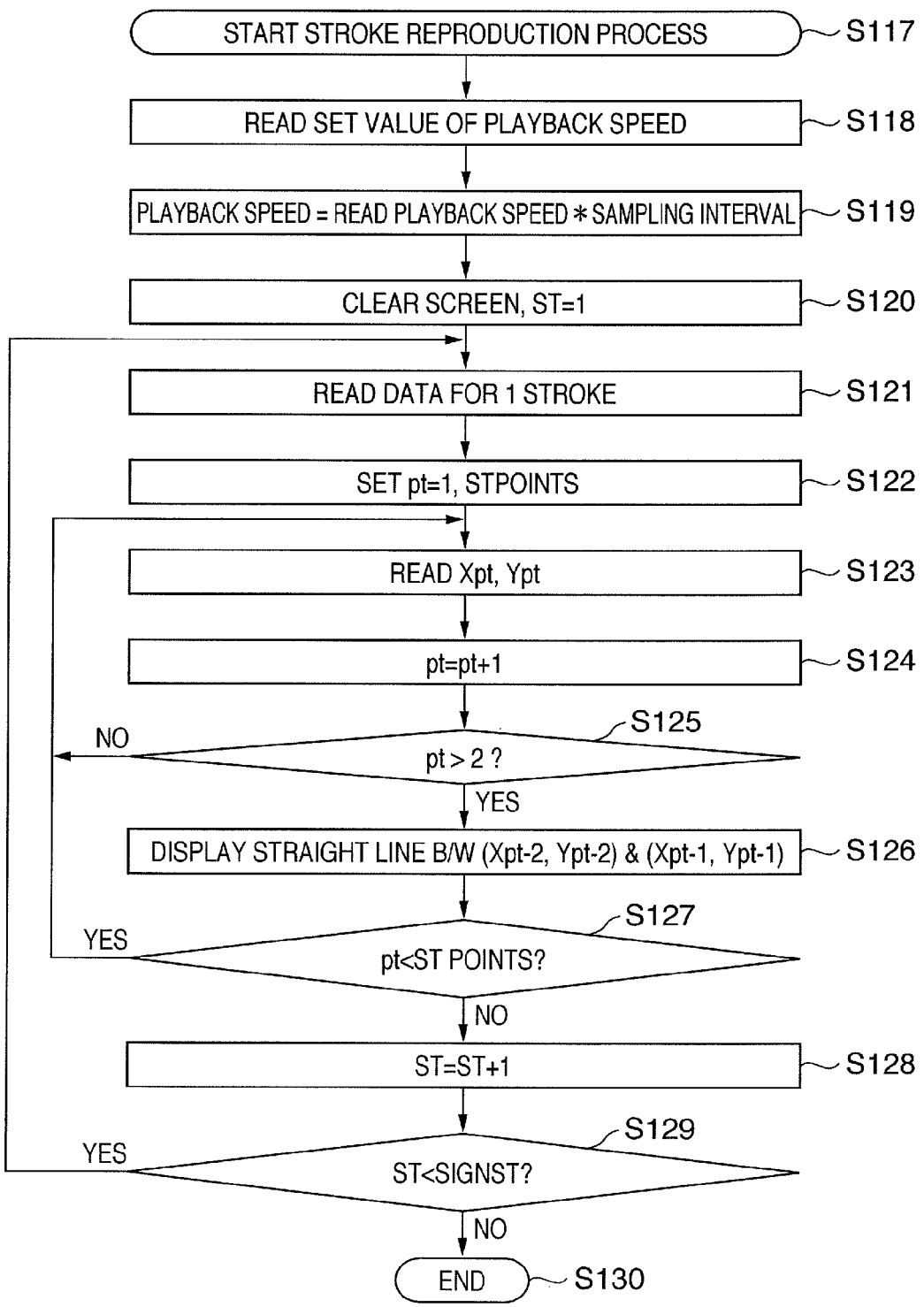
FIG. 23 is a flowchart showing a stroke reproduction process.

FIG. 23 is a flowchart showing a stroke reproduction process. The stroke reproduction process will be described with reference to this flowchart. In step S117, processing is started. A work area is secured and variables are initialized. Note that the popup window 112 shown in FIG. 22 is displayed before this process is started. Note also that the process shown in FIG. 23 relates only to reproducing sample trajectories.

In step S118, the playback speed setting value is read. Specifically, the set value of the playback speed setting bar 115 is read. In the present embodiment, a value in a range of 0.5 to 2 is returned. "0.5" denotes playback at half speed, "1" denotes playback at real-time speed, and "2" denotes playback at double speed.

In step S119, the playback speed is decided. The playback speed is decided from the playback speed setting value read at step S118 and the interval at which signature data is sampled. Specifically, the playback speed is decided by dividing the sampling interval by the playback speed setting value. For example, if the sampling interval is 0.1 seconds and the playback speed setting value is 2, the playback speed will be 0.05 seconds per coordinate point interval.

In step S120, the screen is cleared and the stroke counter is initialized to 1. Specifically, the playback area 116 in FIG. 22 is cleared, and ST=1. In step S121, locus data for one stroke of the signature data string transformed in the second embodiment is read. Specifically, the XY coordinate string of transformed signature data is read to the signature data buffer.

In step S122, the coordinate point counter is initialized to 1 (i.e., pt=1), and the number of coordinate points in the stroke is stored in STpoints. In step S123, a coordinate point of the stroke is read. Specifically, the pt-th coordinate point (Xpt, Ypt) is read. In step S124, the coordinate point counter is incremented. Specifically, pt=pt+1. In step S125, processing is performed to check whether the value of the coordinate point counter is two or more. This is because a straight line cannot be drawn by reading only one point. If two or more, processing proceeds to step S126, and if not, processing returns to step S123.

In step S126, the straight line between the two points (Xpt-2,Ypt-2) and (Xpt-1,Ypt-1) is displayed. The time taken to draw the straight line was decided at step S119. The time referred to here is the time taken to draw from (Xpt-2,Ypt-2) to (Xpt-1,Ypt-1). The straight line needs to be drawn quickly if the distance between (Xpt-2,Ypt-2) and (Xpt-1,Ypt-1) is long, and slowly if the distance between (Xpt-2,Ypt-2) and (Xpt-1,Ypt-1) is short. The drawing time for one pixel is decided by the time calculated at step S119 per distance (number of pixels drawn), and each pixel on a straight line is drawn at this time interval.

In step S127, processing is performed to check whether drawing has been completed to the end of the stroke. If the coordinate point counter is less than the number of points for the stroke, processing returns to step S123, otherwise processing proceeds to step S128 since drawing for all points has been completed.

In step S128, the stroke counter ST is incremented in order to process the next stroke. Specifically, ST=ST+1. In step S129, processing is performed to check whether processing has been completed for all strokes. Specifically, ST<signst. If the value of the stroke counter is less than the number of strokes in the displayed signature data, processing returns to step S121, otherwise processing proceeds to step S130. In step S130, the stroke reproduction process is ended, and the secured work area is released.

A registerable sample signature can thus be reproduced with moving images by performing the stroke reproduction process described with the flowchart of FIG. 23. In other words, registration of an easily copied signature is prevented by providing a unit for determining characteristic information that affects how easily a signature is copied. How the signature should be written can be specifically displayed according to the determination result, by displaying a response message, displaying a sample signature that reflects the input signature, or reproducing a sample signature. Displaying a specific sample signature enables the user to easily write a signature that is difficult to copy with precision when re-inputting signature data.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-126932 filed on Apr. 28, 2006, which is hereby incorporated by reference herein in its entirety.

What is claimed is:

1. An apparatus comprising:
a central processing unit configured to control at least one of:
a determining unit configured to analyze signature data corresponding to a handwritten signature, and determine whether to register the signature based on a characteristic of the signature; and
a notifying unit configured to provide information relating to making the signature registerable according to a writing style of the signature, if it is determined by the determining unit not to register the signature,
wherein the determining unit determines whether to register the signature using as a determination criterion at least one of cumulative angle changes in a locus of the signature, fluctuation in a writing speed of the signature, fluctuation in a size of each character included in the signature, and fluctuation in a center position of each character included in the signature.

2. The apparatus according to claim 1, wherein the notifying unit displays, as a message, information indicating a response method that depends on a determination criterion used to determine not to register the signature.

3. An apparatus comprising:
a central processing unit configured to control at least one of:
a determining unit configured to analyze signature data corresponding to a handwritten signature, and determine whether to register the signature based on a characteristic of the signature; and
a notifying unit configured to provide information relating to making the signature registerable according to a writing style of the signature, if it is determined by the determining unit not to register the signature,
wherein the notifying unit derives a transformation necessary to make the signature registerable based on a determination criterion used to determine not to register the signature, performs the derived transformation on the analyzed signature, and displays the transformed signature.

4. An apparatus comprising:
a central processing unit configured to control at least one of:
a determining unit configured to analyze signature data corresponding to a handwritten signature, and determine whether to register the signature based on a characteristic of the signature; and
a notifying unit configured to provide information relating to making the signature registerable according to a writing style of the signature, if it is determined by the determining unit not to register the signature,
wherein the notifying unit derives a way of writing necessary to make the signature registerable based on a determination criterion used to determine not to register the signature, and uses moving images to show the signature being written in the derived way.

5. A method comprising:
analyzing, using a central processing unit, signature data corresponding to a handwritten signature, and determining whether to register the signature based on a characteristic of the signature; and
providing information relating to the analysis of the signature data, if it is determined not to register the signature,
wherein the information relating to the analysis of the signature data includes a message recommending a change in a writing style of the signature.

6. A method comprising:
analyzing, using a central processing unit, signature data corresponding to a handwritten signature, and determining whether to register the signature based on a characteristic of the signature; and
providing information relating to the analysis of the signature data, if it is determined not to register the signature,
wherein the analysis of the signature data comprises:
examining stroke shapes of the signature.

7. A method comprising:
analyzing, using a central processing unit, signature data corresponding to a handwritten signature, and determining whether to register the signature based on a characteristic of the signature; and
providing information relating to the analysis of the signature data, if it is determined not to register the signature,
wherein the analysis of the signature data comprises:
examining angle changes in strokes of the signature.

8. A method comprising:
analyzing, using a central processing unit, signature data corresponding to a handwritten signature, and determining whether to register the signature based on a characteristic of the signature; and
providing information relating to the analysis of the signature data, if it is determined not to register the signature,
wherein the analysis of the signature data comprises:
examining writing speed of the signature.

9. A method comprising:
analyzing, using a central processing unit, signature data corresponding to a handwritten signature, and determining whether to register the signature based on a characteristic of the signature; and
providing information relating to the analysis of the signature data, if it is determined not to register the signature,
wherein the analysis of the signature data comprises:
examining size of each respective character included in the signature.

10. A method comprising:
analyzing, using a central processing unit, signature data corresponding to a handwritten signature, and determining whether to register the signature based on a characteristic of the signature; and
providing information relating to the analysis of the signature data, if it is determined not to register the signature,
wherein the analysis of the signature data comprises:
examining position of each respective character included in the signature.

11. A non-transitory computer-readable storage medium storing a signature registration program for registering signature data corresponding to a handwritten signature for use in authentication, the program causing a computer to execute operations comprising:

analyzing signature data corresponding to a handwritten signature, and determining whether to register signature based on a characteristic of the signature; and providing information relating to the analysis of the signature data, if it is determined not to register the signature, wherein the information relating to the analysis of the signature data includes a message recommending a change in a writing style of the signature.

* * * * *